United States Patent
Qian

(10) Patent No.: US 10,186,068 B2
(45) Date of Patent: Jan. 22, 2019

(54) METHOD, APPARATUS AND SYSTEM FOR RENDERING AN IMAGE

(71) Applicant: CANON KABUSHIKI KAISHA, Tokyo (JP)

(72) Inventor: Lena Qunying Ye Qian, Artarmon (AU)

(73) Assignee: Canon Kabushiki Kaisha, Tokyo (JP)

(*) Notice: Subject to any disclaimer, the term of this patent is extended or adjusted under 35 U.S.C. 154(b) by 75 days.

(21) Appl. No.: 14/973,309

(22) Filed: Dec. 17, 2015

(65) Prior Publication Data
US 2016/0189417 A1 Jun. 30, 2016

(30) Foreign Application Priority Data
Dec. 24, 2014 (AU) .................................. 2014280960

(51) Int. Cl.
G06T 15/00 (2011.01)
G06T 11/40 (2006.01)
G06T 1/20 (2006.01)
G06T 1/60 (2006.01)

(52) U.S. Cl.
CPC .............. G06T 15/005 (2013.01); G06T 1/20 (2013.01); G06T 1/60 (2013.01); G06T 11/40 (2013.01); G06T 2210/52 (2013.01)

(58) Field of Classification Search
CPC ......... G06T 15/005; G06T 11/40; G06T 1/60; G06T 1/20; G06T 2210/52
See application file for complete search history.

(56) References Cited

U.S. PATENT DOCUMENTS

| 5,220,650 | A | * | 6/1993 | Barkans | .................. | G06F 15/16 345/24 |
| 6,049,390 | A | | 4/2000 | Notredame et al. | | |
| 7,330,192 | B2 | | 2/2008 | Brunner et al. | | |
| 2007/0065001 | A1 | * | 3/2007 | Yu | ........................... | G06T 15/08 382/154 |
| 2009/0303245 | A1 | * | 12/2009 | Soupikov | .............. | G06T 15/005 345/582 |

FOREIGN PATENT DOCUMENTS

AU 2013273768 A1 7/2015

OTHER PUBLICATIONS

Ragan-Kelley, Jonathan, "Keeping Many Cores Busy: Scheduling the Graphics Pipeline", Beyond Programmable Shading 2010, Jul. 29, 2010, pp. 1-75.

* cited by examiner

*Primary Examiner* — Tapas Mazumder
(74) *Attorney, Agent, or Firm* — Canon USA, Inc. I.P. Division

(57) ABSTRACT

A method of rendering an image. A region of the image having pixels suitable for parallel processing is determined. A multi-threaded rendering unit is assigned to render the determined region using a plurality of threads. A reference, for at least one of the threads rendering a pixel on a scan line of the determined region, to another of the threads rendering a first pixel on said scan line is created. The determined region is rendered by the plurality of threads using the created reference. The image is rendered by combining pixels of the rendered determined region, based on corresponding ones of said threads of the multi-threaded rendering unit, with an output of rendering at least one further region.

21 Claims, 22 Drawing Sheets

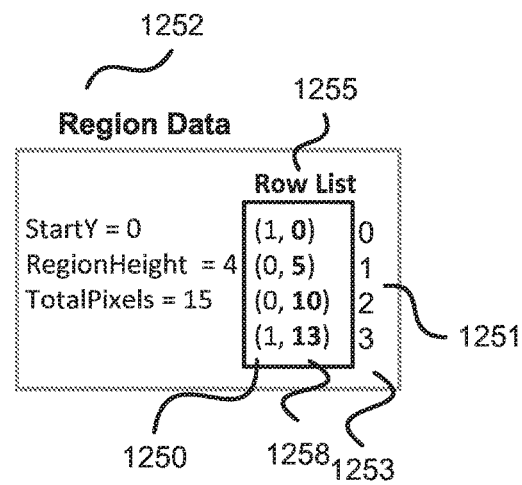
Fig. 12A
Fig. 12B
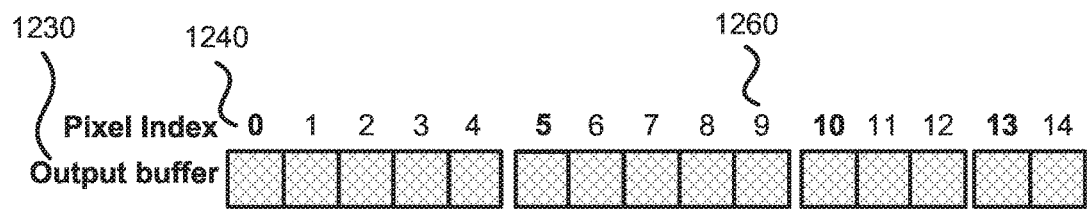
Fig. 12C
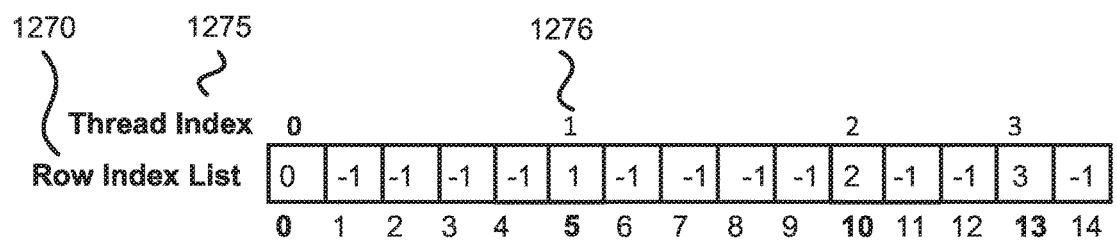
Fig. 12D
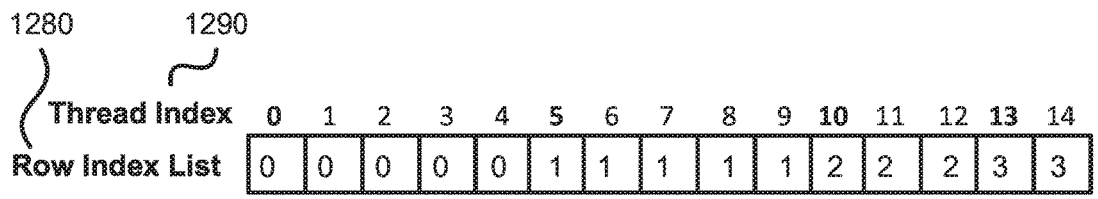
Fig. 12E

METHOD, APPARATUS AND SYSTEM FOR RENDERING AN IMAGE

REFERENCE TO RELATED PATENT APPLICATION(S)

This application claims the benefit under 35 U.S.C. § 119 of the filing date of Australian Patent Application No. 2014280960, filed 24 Dec. 2014, hereby incorporated by reference in its entirety as if fully set forth herein.

TECHNICAL FIELD

The present invention relates generally to the field of graphics rendering and, in particular, to a method, apparatus and system for rendering an image. The present invention also relates to a computer program product including a computer readable medium having recorded thereon a computer program for rendering an image.

BACKGROUND

Processing performance speedup can be achieved through the use of multi-core and multi-processor architectures in computer systems, including printing systems. Multi-core and multi-processor architectures allow a number of computation threads belonging to one or more processes to execute in parallel across a number of cores or processors, thereby reducing the overall execution time.

One multi-core architecture is a graphics processing unit (GPU). GPUs are commonly used to accelerate the rendering of three dimensional (3D) graphics for viewing on a display device. However, in recent years, GPU manufacturers have enabled the general-purpose programming of GPUs. The general-purpose programming of GPUs is commonly known as general-purpose GPU computing (GPGPU). GPUs and other types of architectures, such as single-instruction multiple-data (SIMD) units and field programmable gate arrays (FPGAs), are also known as stream processors.

Modern GPUs typically contain hundreds of simple processing cores, also known as processing elements. Such GPUs are therefore suited to applications and algorithms that can be executed with a large degree of parallelism, requiring little or no communication among parallel threads and minimal branching within a thread's instruction stream. Extracting such a large degree of parallelism from applications originally designed for sequential execution is often difficult. However, the potential benefits of GPU processing can be large.

Print data is often pre-processed to form some kind of region-based intermediate representation. The pre-processing may be done to compress the print data and use less memory, to transfer the print data across a network, or to enable printing in real time, for example. Due to the nature of region-based intermediate representations, it is often difficult to process the region-based intermediate representations with many parallel threads, including on GPU architectures. The main difficulty is that such an intermediate representation is designed to be processed in a sequential fashion. Some prior art methods store the intermediate representation (also referred to as a fillmap) as a sequence of rasterised non-overlapping edges, grouped into tiles of the page. A region is bounded by edges and all pixels within a region are rendered using one set of rendering functions from a compositing stack. Thus, the fillmap is also referred to as a region based representation 540 (seen in FIG. 5C) described by a plurality of edges 541-545, each of which refers to one of the fill compositing sequences 551-554. For each tile, the edges are typically sorted by their start coordinate, first by start y-coordinate and then by start x-coordinate. The start coordinate of an edge is the coordinate of the first pixel in the tile that the edge activates, when pixels are traversed in scan line order and from left to right. For each edge, the x-coordinates of the edge's crossings with successive scan lines are stored in a sequence. To reduce memory usage, each x-coordinate is typically stored as a difference between the x-coordinate and the previous x-coordinate (an encoding method known in the art as "delta encoding"). To render an individual portion of a tile using a region based representation, all edges must be searched sequentially, the delta-encoded x-coordinates decoded, and the x-coordinates sorted along each scan line to identify which edge activates the pixels in the portion being rendered. The process of rendering the portions, repeated for every portion of the tile, requires a large amount of redundant processing (i.e., similar steps are repeated for every portion) and is therefore very inefficient. For this reason, the described region based representation is suitable for processing sequentially, but is not suitable for processing in parallel.

Other known methods render individual tiles of image data in parallel using separate processors. For example, pixels in a rectangular tile are rendered by the parallel processors. However, the rendering functions for pixels might be different. Thus it may cause one processor to wait for others if the processor executing a simple rendering function finishes earlier than other processors executing difficult rendering functions. In this case, some processors are not fully utilised and the rendering performance is not optimal.

Another known method renders regions as polygons. Each polygon is rendered using a 3D rendering pipeline such as OpenGL where each module in the pipeline is executed using special hardware on the GPU. A polygon is first divided into triangles, each of which is then rasterised into fragments. A fragment corresponds to a pixel. It contains a position (x, y), colour, depth(s) and optionally the position of a texel (texture pixel). Each fragment can be modified depending on the required light shading effect and then the fragment is rendered into a pixel colour according to the position, depth and blending function associated with the fragment. The fragments can be rendered into pixels in parallel using the GPU cores. As each fragment has an explicit pixel position (x, y), a thread rendering a fragment knows where to render the corresponding pixel. However, converting the compact intermediate representation in a format suitable for the 3D rendering pipeline is inefficient as the conversion involves re-rasterising the regions described by the edges in the intermediate representation and storing compositing information for rendering each pixel.

Other known methods render a non-rectangular region with an associated compositing stack by subdividing the region into smaller rectangular sub-regions. However, subdividing the region into smaller rectangular sub-regions potentially generates large numbers of small regions. The overheads associated with managing the large number of regions can make the process inefficient.

Thus, a need clearly exists for a more efficient method of rendering an image.

SUMMARY

It is an object of the present invention to substantially overcome, or at least ameliorate, one or more disadvantages of existing arrangements.

Disclosed are arrangements, referred to as Pixel-Parallel Region Rendering (PPRR) arrangements, which seek to address the above problems by processing region-based intermediate representations of an image to be rendered to a form which enables individual pixels, or groups of pixels of the image, to be individually addressable by respective computation threads, in a manner which produces edge-related information for rendering the pixels without needing to perform extensive scan line sequential processing.

According to one aspect of the present disclosure, there is provided a method of rendering an image, the method comprising:
  determining a region of the image having pixels suitable for parallel processing;
  assigning a multi-threaded rendering unit to render the determined region using a plurality of threads;
  creating a reference, for at least one of the threads rendering a pixel on a scan line of the determined region, to another of said threads rendering a first pixel on said scan line;
  rendering the determined region by the plurality of threads using the created reference; and
  rendering the image by combining pixels of the rendered determined region, based on corresponding ones of said threads of the multi-threaded rendering unit, with an output of rendering at least one further region.

A system for rendering an image, the system comprising:
  a memory for storing data and a computer program;
  a program coupled to the memory for executing the computer program, the computer program comprising instructions for:
    determining a region of the image having pixels suitable for parallel processing;
    assigning a multi-threaded rendering unit to render the determined region using a plurality of threads;
    creating a reference, for at least one of the threads rendering a pixel on a scan line of the determined region, to another of said threads rendering a first pixel on said scan line;
    rendering the determined region by the plurality of threads using the created reference; and
    rendering the image by combining pixels of the rendered determined region, based on corresponding ones of said threads of the multi-threaded rendering unit, with an output of rendering at least one further region.

An apparatus for rendering an image, the apparatus comprising:
  means for determining a region of the image having pixels suitable for parallel processing;
  means for assigning a multi-threaded rendering unit to render the determined region using a plurality of threads;
  means for creating a reference, for at least one of the threads rendering a pixel on a scan line of the determined region, to another of said threads rendering a first pixel on said scan line;
  means for rendering the determined region by the plurality of threads using the created reference; and
  means for rendering the image by combining pixels of the rendered determined region, based on corresponding ones of said threads of the multi-threaded rendering unit, with an output of rendering at least one further region.

A computer readable medium having a computer program stored thereon for rendering an image, the program comprising:
  code for determining a region of the image having pixels suitable for parallel processing;
  code for assigning a multi-threaded rendering unit to render the determined region using a plurality of threads;
  code for creating a reference, for at least one of the threads rendering a pixel on a scan line of the determined region, to another of said threads rendering a first pixel on said scan line;
  code for rendering the determined region by the plurality of threads using the created reference; and
  code for rendering the image by combining pixels of the rendered determined region, based on corresponding ones of said threads of the multi-threaded rendering unit, with an output of rendering at least one further region.

Other aspects of the invention are also disclosed.

BRIEF DESCRIPTION OF THE DRAWINGS

One or more embodiments of the invention will now be described with reference to the following drawings, in which:

FIG. 12A shows an example of a non-rectangular region;

FIG. 12B shows region data on GPU memory for a non-rectangular region in FIG. 12A;

FIG. 12C shows an output buffer for a non-rectangular region in FIG. 12A;

FIG. 12D shows an initial state of a row index list during the preparation process before rendering a non-rectangular region;

FIG. 12E shows a final state of a row index list used for rendering a non-rectangular region;

DETAILED DESCRIPTION INCLUDING BEST MODE

Figure 1:
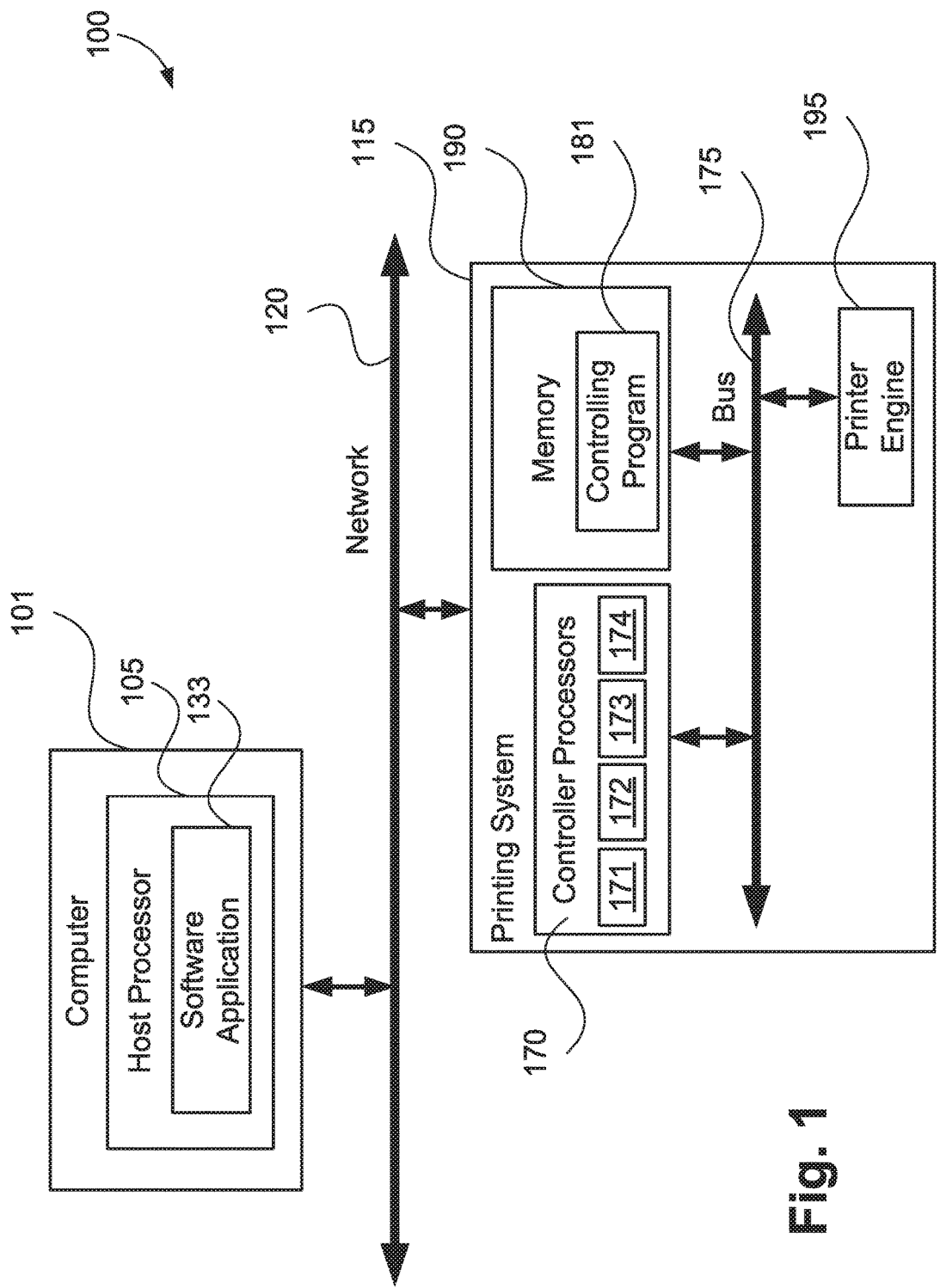
FIG. 1 is a schematic block diagram of a multi-processor printing system for rendering graphic objects of a page.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

Pixel-parallel region rendering (PPRR) arrangements are described below. The disclosed pixel-parallel region rendering (PPRR) arrangements ameliorate the problems of the prior art. Pixel-parallel region rendering (PPRR) methods are described for producing representations that can be accessed randomly and independently by many parallel threads. Pixel-parallel region rendering (PPRR) methods are also described for rendering portions of an image in parallel based on the representations. Such methods can be applied to many multi-processor architectures (e.g., multi-core or many-core), the preferred architecture being a graphics processing unit (GPU). As described in detail below, the disclosed pixel-parallel region rendering (PPRR) methods determine one or more regions of an image having pixels suitable for parallel processing. The disclosed pixel-parallel region rendering (PPRR) arrangements address problems inherent in the application of GPU processing to print data and graphics data in general.

FIG. 1 shows a schematic block diagram of a pixel rendering system 100 for rendering graphic objects. The pixel rendering system 100 comprises a computer module 101 connected to a printer system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices, such as a USB, serial, parallel or FireWire cable.

The computer module 101 comprises at least one host processor 105 for executing a software application 133, such as a word processor or graphical software application.

The printing system 115 comprises plurality of controller processors 170. As shown in FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core central processing units (CPUs), GPUs, or any other form of computer processor such as field-programmable gate arrays (FPGAs). In another alternative, the controller processors 170 may comprise a mixture of the various kinds of processors described above. In one implementation of the disclosed pixel-parallel region rendering (PPRR) arrangements, one of the processors 171-174 is a GPU processor.

The printing system 115 also comprises a printer engine 195 coupled to the controller processors 170, via an interconnected bus 175. The controlling program 181 accepts a printable page 201 produced by a software application 133 and produces pixel data values 206 for printing. The pixel data values 206 may then be stored in memory 190 and reproduced as pixels by the printer engine 195, for example. The controlling program 181 may be executed by the controller processors 170 in one or more threads of execution. A thread consists of a number of instructions or steps that are executed in sequence by one of the processors 171-174. The controlling program 181 will be further described in detail below with reference to FIG. 2.

Figure 3A:
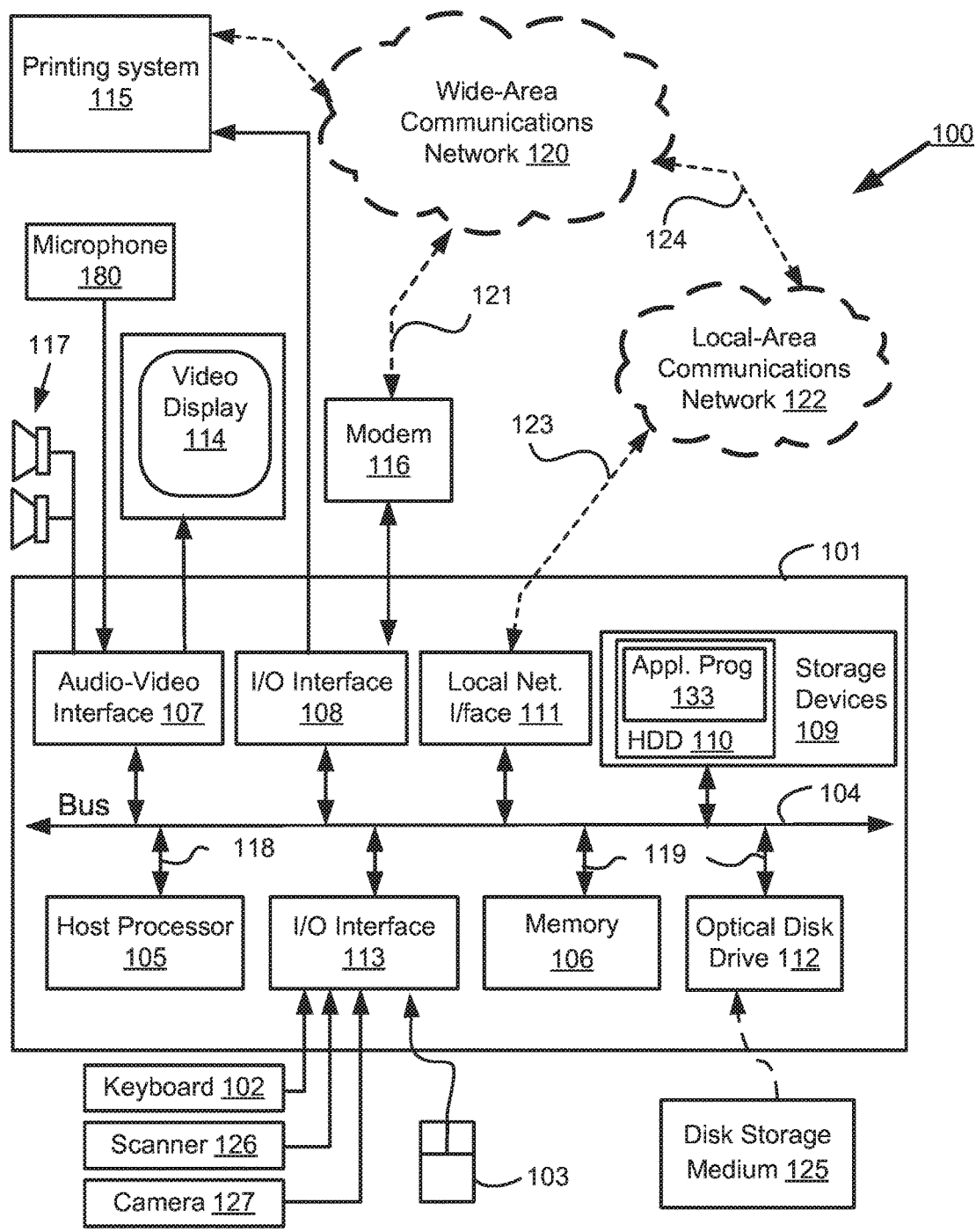
FIGS. 3A and 3B collectively form a schematic block diagram of a general purpose computer system upon which various arrangements described can be practiced.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example, within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2, 4, 6, 7, 9, 11, 13, 15 and 16, to be described, may be implemented as one or more code modules of the software application program 133 executable within the system 100. One or more of the steps of the described methods may be effected by instructions 131 (see FIG. 3B) in the software 133 that are carried out within the system 100. The methods shown in FIGS. 2, 4, 6, 7, 9, 11, 13, 15 and 16, may be performed by the processors 170, of which one may be a GPU processor 301. The described methods can partially be performed by the host processor 105.

As also described below, one or more steps of the processes of FIGS. 2, 4, 6, 7, 9, 11, 13, 15 and 16, to be described, may be implemented as one or more of the code modules forming the controlling program 181 executable within the printing system 115. Again, one or more of the steps of the described methods may be effected by instructions, similar to the instructions 131 in the software 133.

The software instructions implementing the software application program and/or the controlling program may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 and/or the controlling program 181 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the software application program and/or the controlling program and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
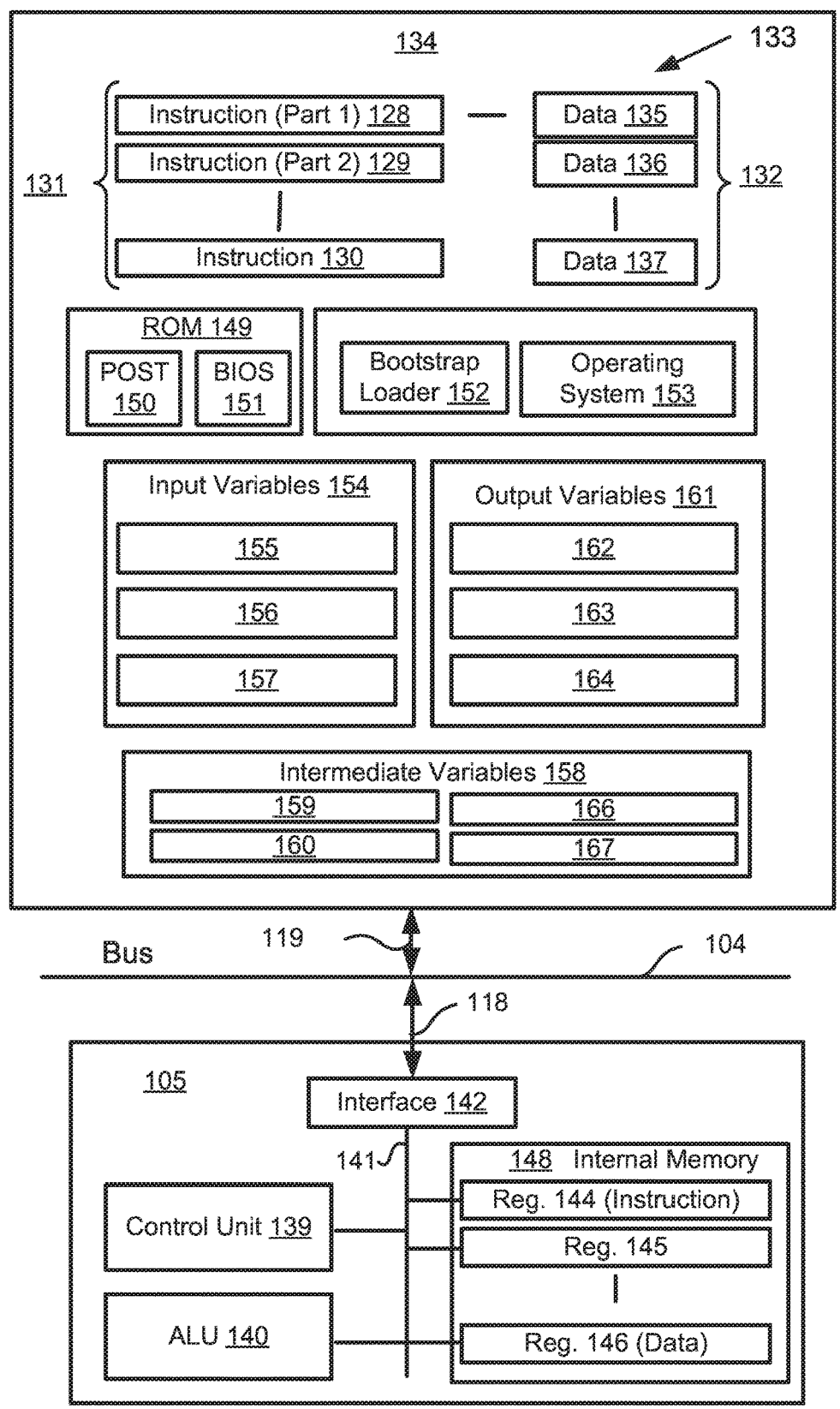

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a) a fetch operation, which fetches or reads an instruction 131 from a memory location 128, 129, 130;
b) a decode operation in which the control unit 139 determines which instruction has been fetched; and
c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2, 4, 6, 7, 9, 11, 13, 15 and 16 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2, 4, 6, 7, 9, 11, 13, 15 and 16, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
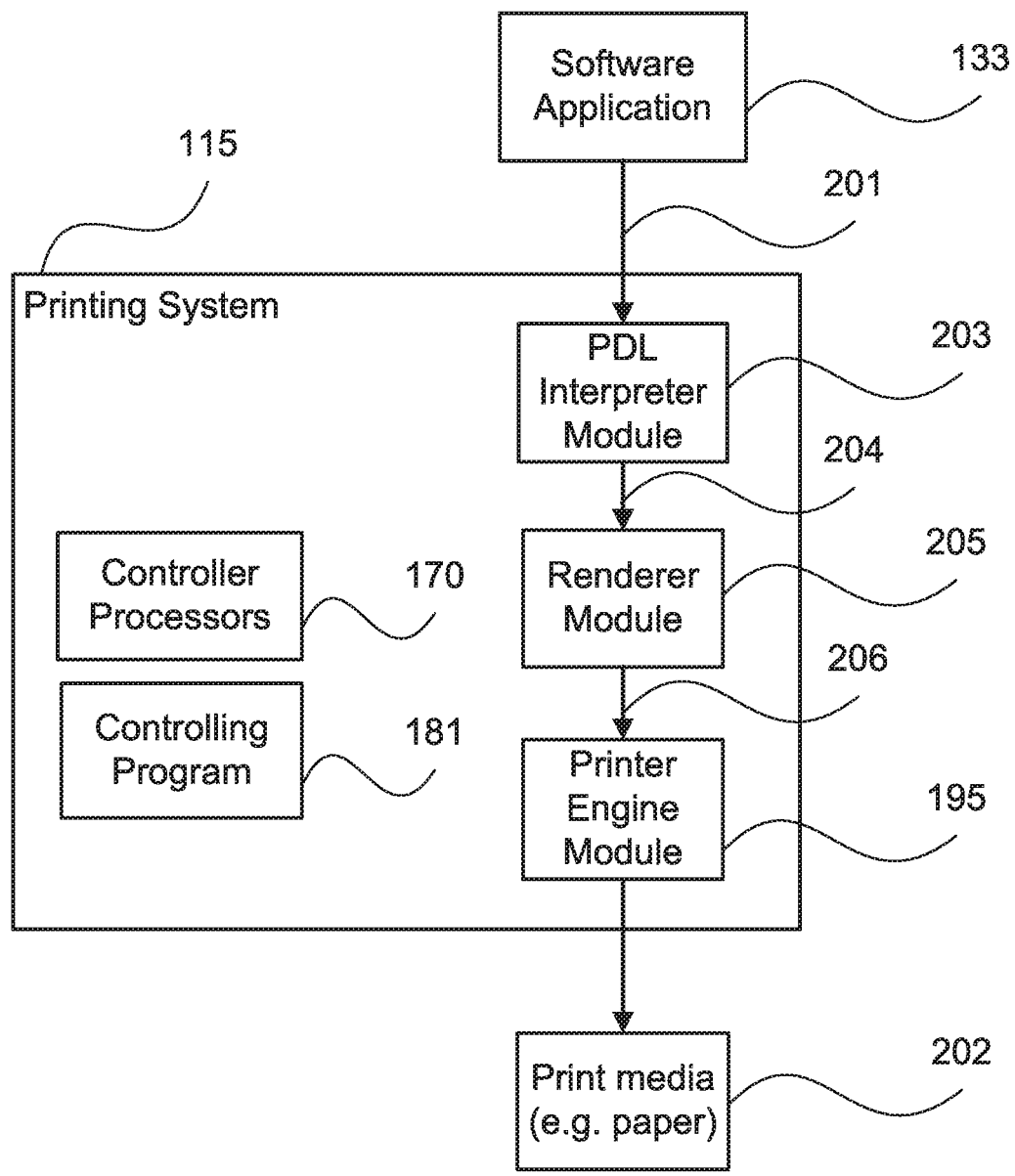
FIG. 2 is an example of a software architecture for the printing system of FIG. 1.

FIG. 2 shows a software architecture for printing a printable page 201 using the computer system 100. Each of the modules 203 and 205 described below may be formed by one or more of the code modules of the controlling program 181 and/or the software application 133.

The software application 133, for example, executing on the computer module 101, provides the printable page 201 to the printing system 115 for printing to a print media 202, such as a paper sheet. The printable page 201 is typically provided in the form of a description of the printable page 201, the description being specified using a Page Description Language (PDL), such as Adobe® PDF or Hewlett-Packard® PCL. The PDL provides descriptions of graphic objects to be rendered onto the print media 202 in a rendering (or z) order, as opposed to a raster image (i.e., a bitmap of pixel values) of the page to be printed. The printable page 201 may be the whole or part of a print job created by the software application 133 executing in the computer module 101.

A PDL interpreter module 203 receives the printable page 201 and generates graphic objects 204 to be printed. The printing system 115 then uses a renderer module 205 to render the graphic objects 204 to pixel data values 206. The pixel data values 206 are printed to the print media 202, such as paper, using a printer engine module 195. The printer engine module 195 may, for example, be an electro-photographic engine.

The PDL interpreter module 203 and renderer module 205 may be implemented as one or more code modules of the controlling program 181 which is executed by the controller processors 170 within the printing system 115. The renderer module 205 will be described in more detail later with reference to FIG. 4.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Figure 3C:
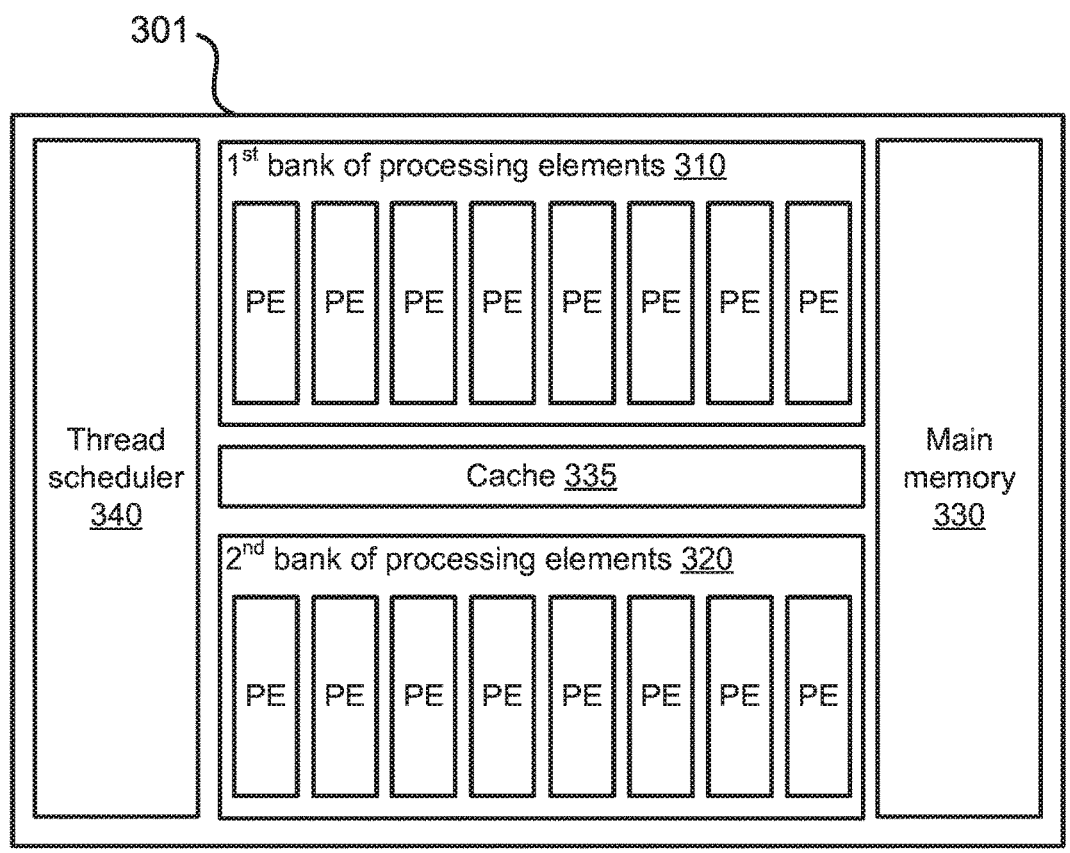
FIG. 3C is a schematic block diagram of a GPU processor upon which various arrangements described can be practiced.

As described above, the controller processors 170 can take many different forms, including single-core CPUs and GPUs. A schematic block diagram of a central processing unit (CPU) was described previously with reference to FIG. 3B. A schematic block diagram of a GPU 301 will now be described with reference to FIG. 3C. A GPU comprises various processing elements. The example GPU 301 contains two banks of processing elements 310 and 320. Each processing element (PE) is capable of executing many threads of execution in parallel using one or more SIMD (single instruction multiple data) arrays. A processing element may also contain a small amount of fast cache memory and a scheduler for deciding which threads to execute at any given point in time. A higher-level thread scheduler 340 allocates blocks of threads to individual processing elements. Another level of cache memory 335 is typically provided between the processing elements 310 and 320, and main memory 330. Main memory 330 may be a subset of the memory 190 of the printing system 115, or may be entirely separate memory that is considered part of the GPU. The main memory 330 is typically large and slow to access. Many variations in GPU architecture exist, but most architectures share the general components shown in FIG. 3C.

Returning to FIG. 1, in the pixel rendering system 100, the software application 133 creates printable pages for printing, such as printable page 201. The printable page 201 often contains graphic objects such as text, lines, fill regions, and image data. The software application 133 sends a high-level description of the printable page 201 (e.g., a PDL file) via the network 120 to the controlling program 181 that is executed by the controller processors 170 of the printing system 115. The printable page 201 contains all information required by the printing system 115 to render and print the page.

In alternative arrangements, the printing system 115, the controller processors 170 and controlling program 181, may be resident in separate servers connected to the network 120, such as the computer system 101. In still another alternative arrangement, the printing system 115, the controller processors 170 and controlling program 181 may be resident in a distributed network of servers. In arrangements where the printing system 115, the controller processors 170 and controlling program 181 are resident in separate servers or in a distributed network of servers, the raster image representation produced by the controlling program 181 is sent to the printer engine module 195 via a network rather than the bus 175.

The described pixel-parallel region rendering (PPRR) methods may also be implemented as part of other graphics rendering systems in which an intermediate representation is rendered (e.g., for displaying PDF documents on an LCD display). As such, the described pixel-parallel region rendering (PPRR) methods are not limited to printing systems.

Figure 4:
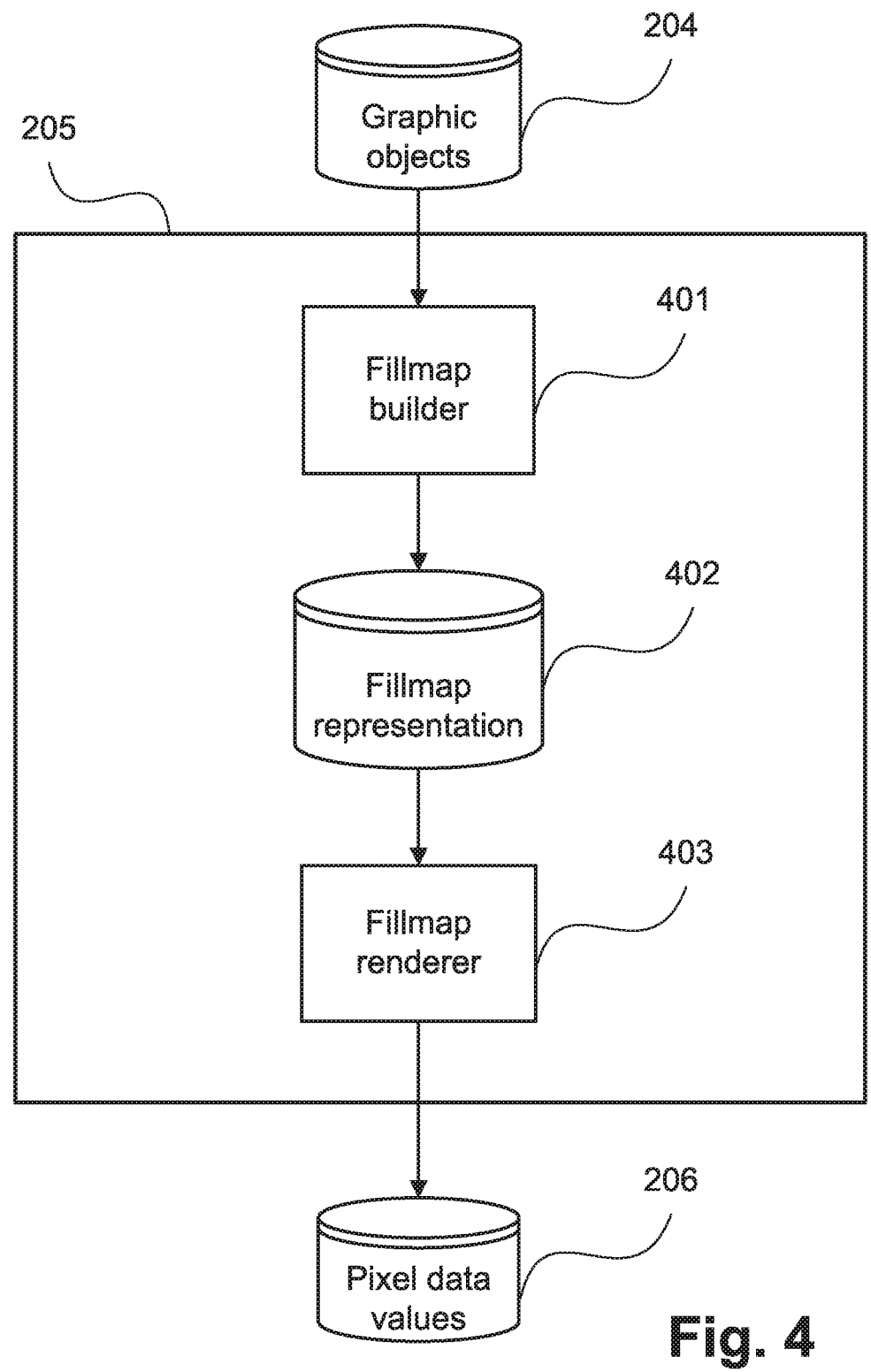
FIG. 4 is a schematic block diagram of a renderer module upon which various arrangements described can be practiced.

The renderer module 205 will now be described in more detail with reference to FIG. 4. The renderer module 205 comprises fillmap builder module 401 and a fillmap rendered module 403. The fillmap builder module 401 and the fillmap renderer module 403 may be formed by one or more of the code modules of the controlling program 181 and/or the software application 133. The renderer module 205 contains or otherwise implements one implementation of rendering graphic objects 204 to pixel data values 206 according to the disclosed pixel-parallel region rendering (PPRR) arrangements.

As described above with reference to FIG. 2, the renderer module 205 receives graphic objects 204. The fillmap builder 401 receives the graphic objects 204 in an order known as z-order. The fillmap builder 401 converts the graphic objects 204 into an intermediate representation. In one pixel-parallel region rendering (PPRR) arrangement, the intermediate print data representation is fillmap representation 402, which is a pixel-aligned region-based representation. The process executed by the fillmap builder 401 will be described in more detail below with reference to FIG. 5A, FIG. 5B, FIG. 5C and FIG. 5D.

The fillmap renderer 403 receives the fillmap representation 402 and renders the fillmap representation 204 to pixel data values 206. The rendering process executed by the fillmap renderer 403 will be described in more detail below with reference to FIG. 6.

As described above with reference to FIG. 2, the controlling program 140, and therefore the renderer component 205, is executed by the controller processors 170. The fillmap builder 401 and fillmap renderer 403 may utilise any suitable multi-threading method to reduce the time spent processing the graphic objects 204.

A fillmap representation of a graphical image such as a page will now be described in more detail. A fillmap is a region-based representation of a graphical image such as a page. The fillmap maps a region of pixels within the page to a fill compositing sequence which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges:

(i) are monotonically increasing in the y-direction of the page;
(ii) do not intersect each other;
(iii) are aligned with pixel boundaries, meaning that each pixel-aligned fillmap edge consists of a sequence of segments, each of which follows a boundary between two contiguous pixels;
(iv) contain a reference to the fill sequence required to be composited to render to pixels the fillmap region to which the pixel-aligned fillmap edge belongs; and
(v) activate pixels within a single fillmap region.

In one pixel-parallel region rendering (PPRR) arrangement, references to fill compositing sequences are indices into a table of fill compositing sequences.

On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill compositing sequence active within each fillmap region of pixels is stored in the table of fill compositing sequences. A fill compositing sequence is a sequence of z-ordered levels, where each level contains attributes such as a fill, the opacity of the level, a compositing operator which determines how to mix the colour data of this level with other overlapping levels, and the priority, or z-order, of the level. A fill compositing sequence contains references to all the levels which contribute colour to the pixels within a fillmap region. The table of fill compositing sequences contains all of the fill compositing sequences required to render the page to pixels. In one arrangement, the table of fill compositing sequences does not contain duplicate instances of identical fill compositing sequences. Hence, multiple fillmap regions within a fillmap which map to the same fill compositing sequence map to the same instance of the fill compositing sequence within the table of fill compositing sequences.

Figure 5A:
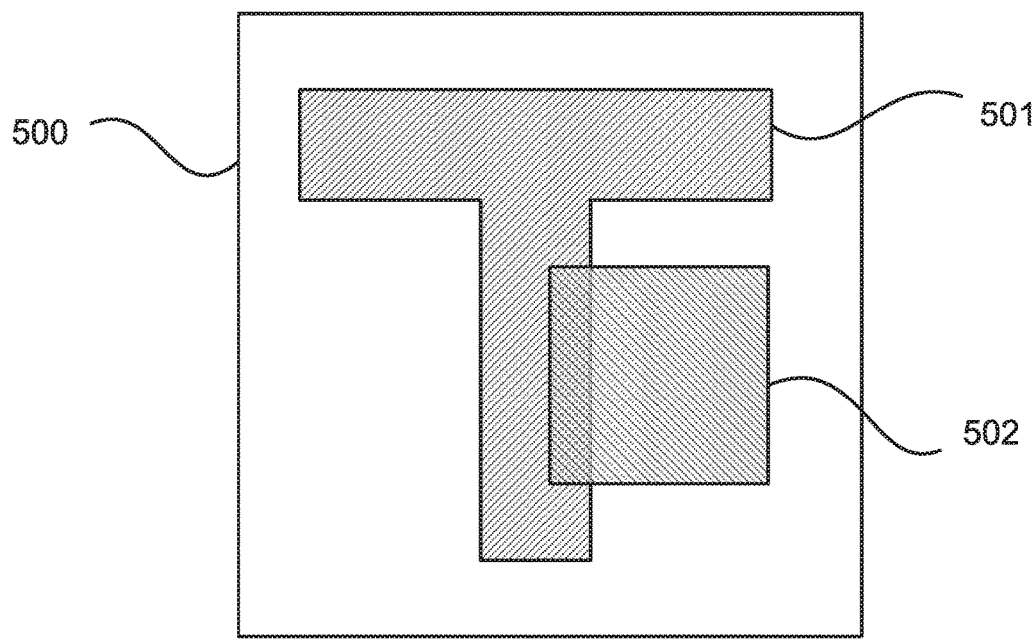
FIG. 5A shows an exemplary page with graphic objects.

The generation of a fillmap representation of a page will now be described with reference to FIG. 5A to FIG. 5D. FIG. 5A shows a page representation 500. The page 500 has a white background and contains two graphic objects 501 and 502. The first graphic object 501 is an opaque "T" shaped object with a right-leaning hatched fill. The second graphic object 502 is a transparent square with a left-leaning hatched fill. Examples of other fills are blends representing a linearly varying colour, bitmap images or tiled (i.e., repeated) images. The second graphic object 502 partially overlaps the first graphic object 501.

Figure 5B:
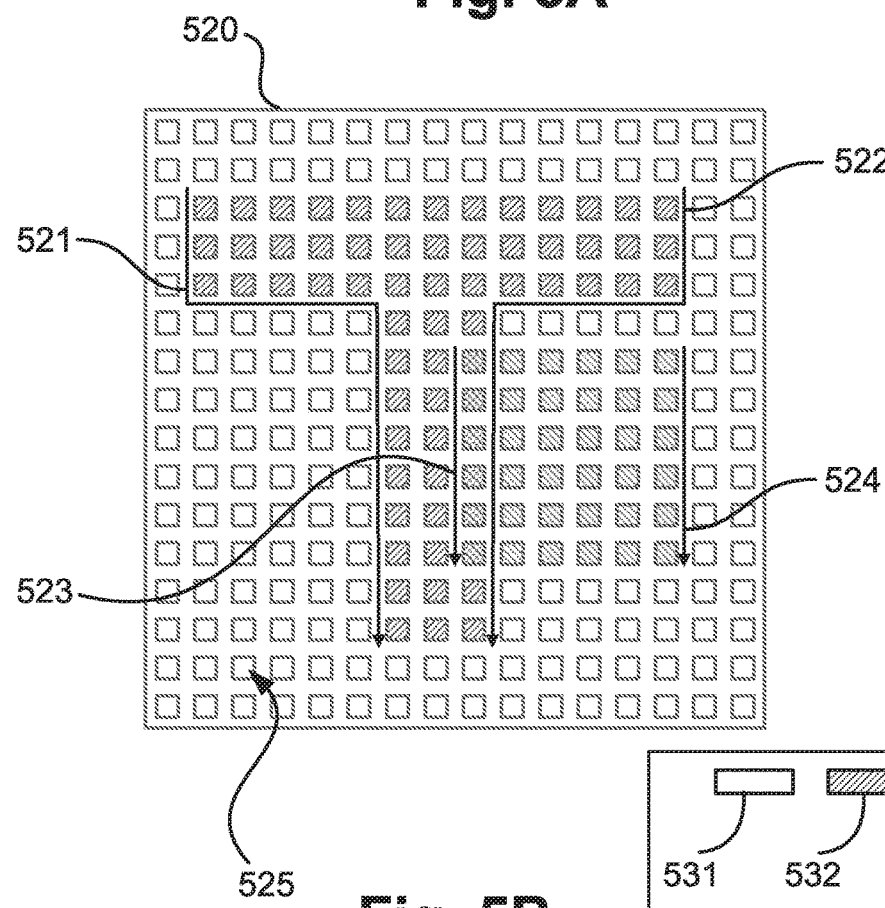
FIG. 5B shows pixel-aligned object edges, and associated fills, of the page of FIG. 5A.

FIG. 5B shows the decomposition of the graphic objects 501 and 502 of the page 500 into pixel-aligned graphic object edges, levels and fills according to a pixel grid 520. A graphic object is decomposed into two or more pixel-aligned object edges, a single level, and one or more fills. Pixel-aligned graphic object edges define the activation or deactivation of a level during rasterisation. Pixel-aligned graphic object edges therefore refer to the level of the object from which they are derived. The first graphic object 501 is decomposed into two pixel-aligned graphic object edges 521 and 522, and a level 532 that consists of a right-leaning hatched fill. Pixel-aligned graphic object edges 521 and 522 refer to the level 532 of the first graphic object 501. The second graphic object 502 is decomposed into two pixel-aligned graphic object edges 523 and 524, and a level 533 that consists of a transparent left-leaning hatched fill. Pixel-aligned graphic object edges 523 and 524 refer to the level 533 of the second graphic object 502. The background 525 has a level 531 that consists of white fill.

Figure 5C:
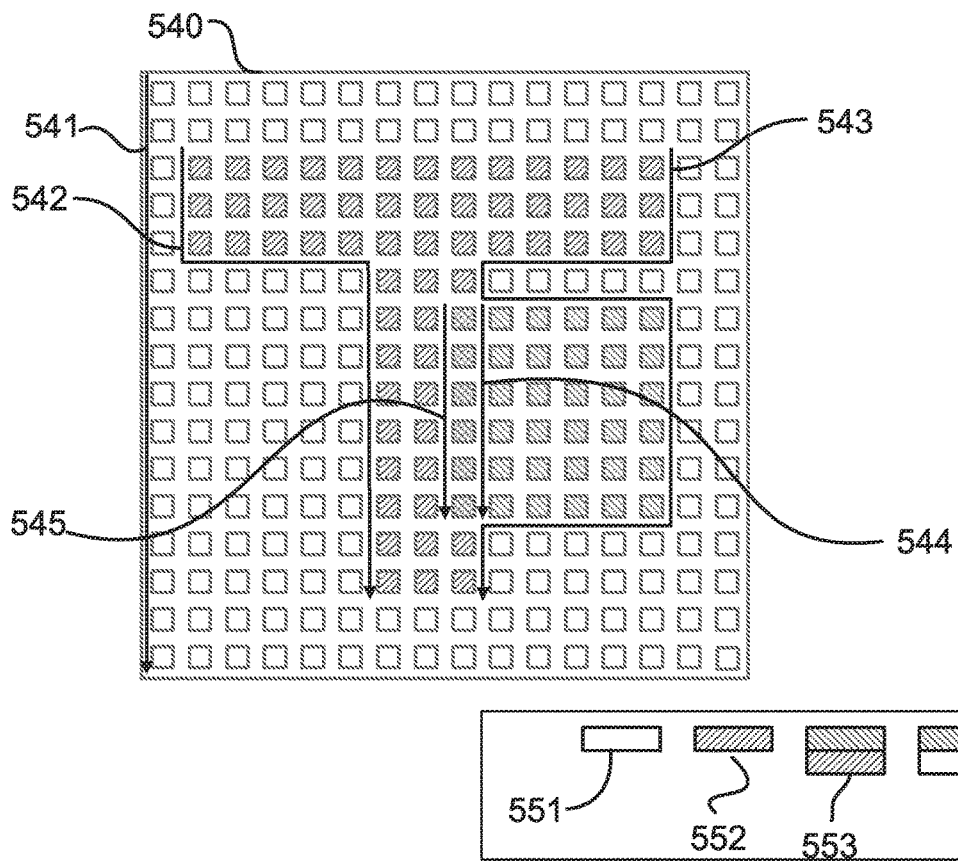
FIG. 5C shows a fillmap representation of the page of FIG. 5A.

FIG. 5C shows a fillmap representation 540 of the page 500 represented in FIG. 5A. The fillmap representation 540 is composed of five pixel-aligned fillmap edges, hereafter referred to as "edges" or "fillmap edges". Each edge references a fill compositing sequence which will be used to determine the colour of each of the pixels activated by that edge. On any given scan line on which an edge is active, the edge will activate those pixels which are immediately to the right of the edge, until the next edge or a page boundary is encountered. First edge 541 traces the left hand boundary of the page 500, and references a fill compositing sequence 551 which contains a single opaque level which is to be filled using the background fill. Second edge 542 traces the left hand boundary of the first graphic object 501, and references a fill compositing sequence 552 that contains a single level which is opaque and is to be filled using a right-leaning hatched fill. Third edge 543 references the same fill compositing sequence 551 as the first edge 541. Fourth edge 544 traces the left hand boundary of a region where the second object 502 overlaps the white background. The fourth edge 544 references a fill compositing sequence 554 which contains two levels. A top most level of fill compositing sequence 554 is transparent and is to be filled using a left-leaning hatched fill. A bottom most level fill compositing sequence 554 is opaque and is to be filled using the background fill. Fifth edge 545 traces the left hand boundary of the region where the second graphic object 502 overlaps the first graphic object 501. The fifth edge 545 references a fill compositing sequence 553 which contains two levels. The top most level of fill compositing sequence 553 is transparent and is to be filled using a left-leaning hatched fill. A bottom most level of fill compositing sequence 553 is opaque and is to be filled using a right-leaning hatched fill.

Accompanying the fillmap representation 540 of the page is a table of fill compositing sequences which contains the fill compositing sequences 551, 552, 553 and 554 referenced by the edges contained in the fillmap representation 540 of the page 500.

Figure 5D:
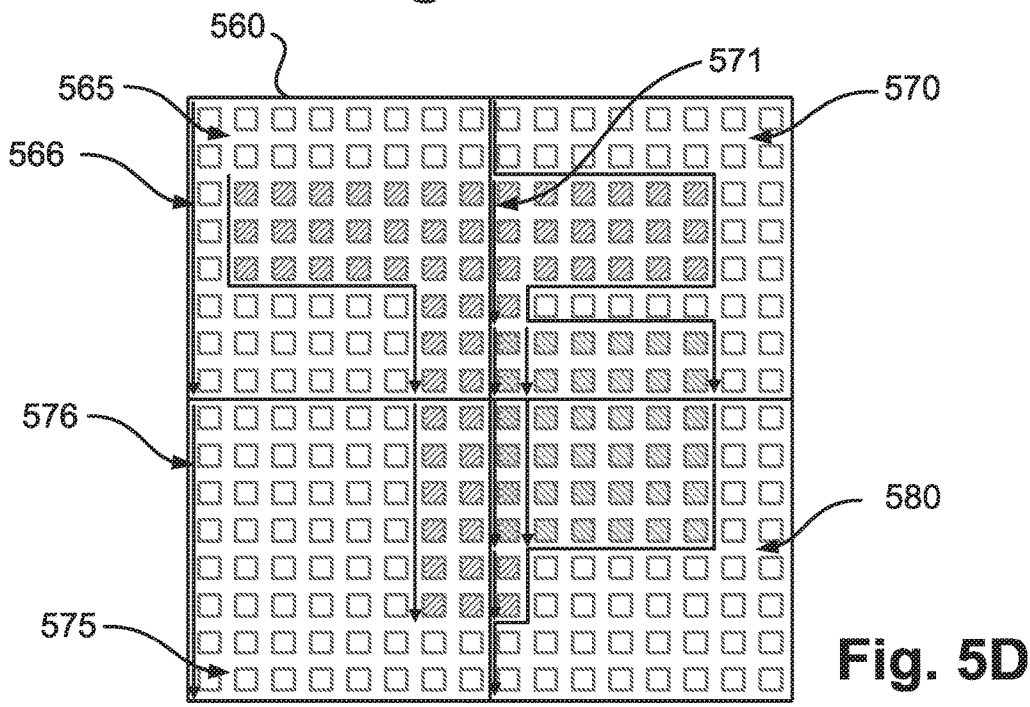
FIG. 5D shows a tiled fillmap representation of the page of FIG. 5A.

FIG. 5D shows a tiled fillmap representation 560 of the page 500 represented in FIG. 5A. The tiled fillmap representation 560 contains four tiles 565, 570, 575 and 580. Each tile has a height and width of eight pixels. In order to generate the tiled fillmap representation 560 of the page, the edges of the original fillmap representation 540 have been split across fillmap tile boundaries. For example, the edge 541 which traces the left hand boundary of the page 500 in the untiled fillmap representation 540 shown in FIG. 5C has been divided into two edges 566 and 576. The first edge 566 activates pixels in the top-left hand tile 565, while the second edge 576 activates pixels in the bottom-left hand tile 575. New edges have been inserted on the tile boundaries to activate the left most pixels of each tile which were previously activated by an edge in a tile to the left of the tile in which the pixels reside. For example, in the top-right tile 570 a new edge 571 has been inserted to activate pixels which were activated by the edge 542 which traces the left hand boundary of the first graphic object 501 in the original fillmap representation 540 shown in FIG. 5C.

In one arrangement, the fillmap representation and tiled fillmap representation store edges in order of increasing start coordinate. More specifically, edges are sorted first by start y-value, then edges with equal start y-value are sorted by start x-value. The start coordinate of an edge is the coordinate of a first pixel in the fillmap or fillmap tile that the edge activates, when pixels are traversed in scan line order and from left to right. For example, the start coordinate of edge 542 shown in FIG. 5C is (x=1, y=2), if the coordinate of the top-left pixel is (x=0, y=0). The edge 542 has a start x-value of one (1), and a start y-value of two (2). For example, with reference to the fillmap representation 560, edges will be stored in the order 541, 542, 543, 545, 544. The remaining coordinates of the first pixel on each scan line activated by an edge are stored as a sequence of x-values with successive y-values beginning at the start y-value. Optionally, the sequence of x-values is further encoded using a method known as "delta encoding". That is, each x-value is stored as the difference between the x-value and the previous x-value in the sequence of x-values of the corresponding edge. An example of storing the edges of the fillmap representation will be described below with reference to FIG. 12. In a tiled fillmap representation, a separate list of edges is retained for each tile.

Overview

The disclosed pixel-parallel region rendering (PPRR) arrangements address the problem of efficiently rendering region-based intermediate representations using processors containing many cores, such as GPUs. As a non-rectangular region described by the edges from an intermediate representation might have a variable number of pixels and different starting x-coordinate in each scan line, it is difficult to map each of the parallel threads to the coordinates of the pixel rendered by that thread. Thus, an indexing data structure is created based on the edge data extracted from the intermediate representation. The indexing data structure provides a fast method for independent threads of execution to determine corresponding pixel positions and render the pixels with one set of rendering instructions. The indexing data structure enables highly parallel rendering with fully occupied GPU cores.

Figure 6:
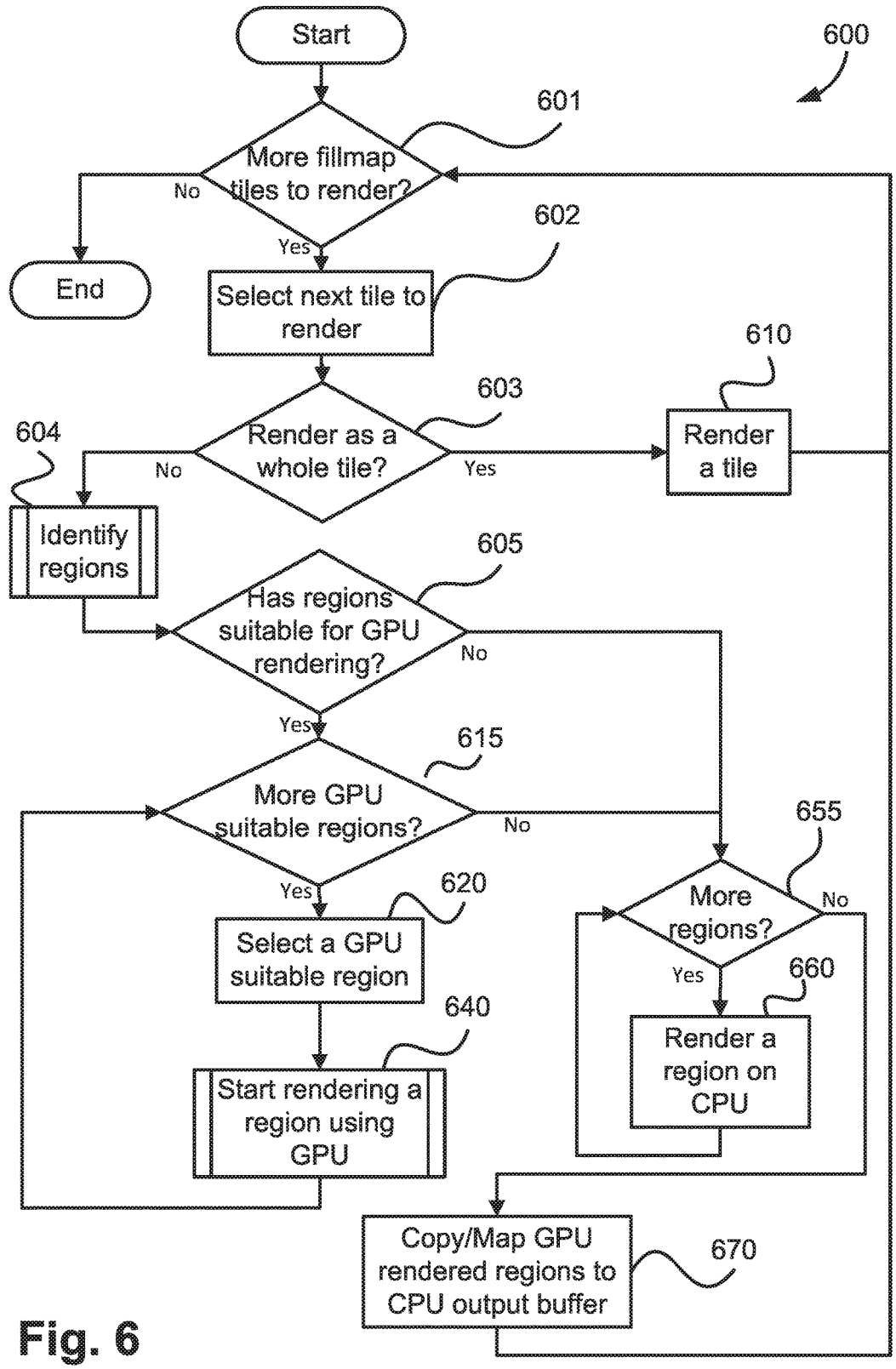
FIG. 6 is a schematic flow diagram showing a method of rendering a tiled fillmap representation as used in a fillmap renderer.

A method 600 of rendering a fillmap representation 402 according to the fillmap renderer 403 will now be described with reference to FIG. 6. The method 600 may be implemented as one or more software code modules of the controlling program 181 resident in the memory 190 and being controlled in its execution using a combination of the CPU and GPU controller processors 170 of the pixel rendering system 100. The pixel rendering system 100 is a multi-threaded rendering unit. As described below, the pixel rendering system 100 is assigned to render determined regions of the fillmap representation 402.

The method 600 and other methods described below will be described by way of example where the processor 171 is a CPU and the processor 172 is a GPU, and where the method 600 is executed using the CPU 171 and the GPU 172. However, any of the processors 171, 172, 173 and 174 may be used to execute the described methods. The CPU 171 may have a similar configuration, and will be described below as having a similar configuration, to the configuration of the processor 105 as shown in FIG. 3B. Further, the GPU 172 may have a similar configuration, and will be described below as having a similar configuration, to the configuration of the GPU 301 shown in FIG. 3C.

The method 600 will be described, again by way of example, with reference to the rendering of a tiled fillmap representation, such as the example tiled fillmap 560, described with reference to FIG. 5D. Other disclosed pixel-parallel region rendering (PPRR) arrangements may be used to render a non-tiled fillmap representation, such as the example fillmap 540 described previously with reference to FIG. 5C. The disclosed pixel-parallel region rendering (PPRR) arrangements can be used to render intermediate representations other than the fillmap representation.

The method 600 begins at a decision step 601 where it is decided if there are more tiles in the fillmap representation 402 remaining to render, under execution of the processors 170. If it is determined that there are more tiles to render, then the method 600 proceeds to selecting step 602, where the next tile to render is selected. Tiles may be rendered in any sequence, such as from top to bottom and left to right, or in parallel in any order. The processing then continues to a decision step 603 to determine whether the selected tile is suitable for rendering as a whole tile or whether the selected tile is suitable for rendering region by region. There are many rules that may be used to determine if the selected tile is suitable for rendering as a whole tile. For example, if a particular tile has only one edge, all pixels in the tile will be rendered using the same compositing stack. Thus, the particular tile is suitable for a whole tile rendering method (referred to as "tile rendering method").

If a particular tile has one region with complicated compositing instructions and other regions have less complex compositing instructions, then the particular tile is determined not suitable for whole tile rendering. For example, if the number of levels in a compositing stack (or stack levels) for one region is much higher than for other regions, or the compositing formula for one region involves more computations than other regions, the tile is better rendered region by region.

Compositing formulas may be different alpha blending functions or different compositing operations such as ATOP or XOR from Porter-Duff compositing algebra. Determining a region suitable for parallel processing may comprise detecting a region having compositing complexity above a predetermined threshold and being significantly different from compositing complexity of other regions within the same tile.

The predetermined threshold used for determining complexity can be, for example, a predetermined number of level differences in compositing stacks, e.g., the predetermined threshold may be equal to ten (10). If one compositing stack has twenty (20) levels of fills and another compositing stack has two levels of fills. The difference between these two stack levels is eighteen (18) levels which is greater than the predetermined threshold (i.e., 10). Thus, two compositing complexities are considered significantly different.

Another predetermined threshold may be a predetermined number of compositing instructions used to perform compositing and the like. For example, if A is number of compositing instructions defined for a first portion of the tile and B is number of compositing instructions defined for a second portion of the same tile, then the two portions are considered to involve significantly different compositing complexity if a difference between A and B is above the predetermined threshold.

Still another predetermined threshold may be a plurality of rendering instructions. Similarly, if a difference between a first set of rendering instructions applied for a first portion of the tile and a second set of rendering instructions applied to a second portion of the tile exceeds the predetermined threshold, then the first portion has significantly different complexity compared to complexity of the second portion within the same tile. In this case a rendering instruction defines a pixel colour and can include image scaling, rotation or colour conversion, gradient fill (2-point or 3-point blend), flat colour fill and the like.

If there are at least two regions (or portions) within a tile having significantly different complexity, the tile is considered as non-uniformly complex. Otherwise, the tile is treated as uniformly complex.

If a tile is uniformly complex and the complexity is below such a predetermined threshold, a processing mode is determined for the whole tile rendering. However, if the tile is non-uniformly complex, at least two processing modes may be determined for the tile, one processing mode for at least one region of the tile having different complexity. For example, if complexity varies significantly across a particular tile, it is more efficient to render the particular tile on a region basis rather than on a tile basis.

If a tile has too many edges, e.g., hundreds or thousands of edges, rendering region by region is not efficient. The method of rendering a tile region by region is referred to as a "region rendering method".

If it is decided that the tile is suitable for whole tile rendering, the method 600 proceeds to rendering step 610, where the tile is completely rendered on a CPU (e.g., processor 171) or GPU (e.g., processor 172) of the control processors 170. If a tile is rendered on a CPU, then the sequential algorithm of scan line conversion could be applied to the tile to render the tile. If a tile is rendered on a GPU, then a parallel rendering method could be used, where each pixel or each group of pixels (such as a scan line) in the tile is rendered by one of a set of threads. Each thread is identified by an index which can be mapped to a pixel or a set of pixels (such as a scan line) to be rendered. So each pixel is rendered by a thread having a thread index referring to a set of pixels (or scan line) where the pixel appears. In the case of pixel-parallel rendering, the pixel position calculated from a thread index is used to find an edge and an associated compositing stack for rendering the pixel. The threads rendering the tile can execute different rendering functions using different compositing stacks in parallel.

Upon completion of the tile rendering step 610, the method 600 returns to the decision step 601.

If a tile is not suitable for tile rendering, then the method 600 proceeds to identifying step 604. At step 604, regions in the selected tile are identified, via the edges of the tile, under execution of the processors 170. Steps 604 and 605 determine if a region of the image have pixels suitable for parallel processing. A method 700 of identifying regions of a tiled fillmap representation 402, as executed at step 604, will be described in more detail below with reference to FIG. 7. Following step 604, the method 600 proceeds to decision step.

At decision step 605, it is determined, under execution of the processors 170, if there are any regions of the selected tile suitable for rendering on the GPU 172. If it is determined that there are one or more regions of the selected tile suitable for rendering on the GPU 172, e.g., the region has an image fill, then the method 600 proceeds to a decision step 615. Otherwise, the method 600 proceeds to a different decision step 655.

At the decision step 615, if it is decided that there are regions of the selected tile remaining that are suitable for rendering by the GPU 172, then the method 600 proceeds to selecting step 620. At step 620, a region which is suitable for rendering on the GPU 172 is selected under execution of the processors 170. Following step 620, the method 600 then continues to rendering step 640. At step 640, the selected region is rendered on the GPU 172 of the processors 170. At step 640, a region rendering method 900 (see FIG. 9) is executed on the GPU 172 without waiting until the completion of the rendering. The method 900 of rendering a region of a fillmap tile, using pixel-parallel rendering, will be described in more detail below with reference to FIG. 9.

Upon completion of the step 640, the method 600 returns to the decision step 615.

If it is determined at the decision step 615 that there are no more GPU suitable regions, then the method 600 continues to another decision step 655. At step 655, it is determined if there are more regions of the tile selected at step 602 left to render. If there are any regions of the selected tile remaining to be rendered, then the method 600 proceeds to rendering step 660. At step 660, a region of the selected tile is rendered on the CPU 171. The rendered pixels may be stored in an output buffer (e.g., local or internal memory 148) of the CPU 171. The CPU 171 may be configured for creating the output buffer for storing the pixels of the region. The CPU 171 may also be configured for establishing a correspondence between the pixels stored in the output buffer and parallel threads using pixel indices and thread indices as described in detail below. Upon completion of step 660, the method 600 returns to decision step 655.

If it is determined at the decision step 655 that there are no more regions of the tile selected at step 602 left to render, then the method 600 proceeds to copying step 670. At step 670, all regions of the selected tile rendered on the GPU 172 are copied back from the GPU 172 to the output buffer (e.g., local or internal memory 148) of the CPU 171. The rendered pixels of the determined regions may be stored in an intermediate buffer in a compact format on the GPU 172 before being distributed to corresponding locations in the output buffer of the CPU 171.

Upon completion of the step 670, rendering regions of the selected tile on both the CPU 171 and GPU 172 is completed and the method 600 returns to the decision step 601 to render the next tile of the fillmap representation 402.

The reason for rendering GPU-suitable regions of a tile before CPU-suitable regions is because of potential parallelism of GPU and CPU rendering. A method 1300 of rendering a region in a fillmap tile, using GPU kernel launch, will be described in detail below with reference to FIG. 13. GPU kernel launch is an asynchronous call for some GPU hardware (e.g., GPU 172), which means that the call of the kernel launch returns to CPU 171 control without waiting for the completion of the GPU 172 execution. The CPU 171 can continue other instructions, e.g., launching another GPU 172 kernel or rendering a region on the CPU 171. All launched kernels are queued on the GPU 172 and executed one after another. The rendered pixels may be buffered on the GPU memory (e.g., 330) while other tiles are rendered on the CPU 171. Upon completion of rendering every region on a CPU (e.g., 171), a check on the completion of the rendering of a region on a GPU (e.g., 172) is performed. If the GPU region rendering is completed, the rendered pixels are transferred from GPU 172 to the CPU 171. Otherwise, another tile of the fillmap representation 402 can be rendered on the CPU 171.

If it is determined at the step 601 that there are no more fillmap tiles to render, the entire fillmap representation 402 has been rendered to pixel data values 206 and the method 600 completes.

Once all tiles of the fillmap representation 402 have been rendered in accordance with the method 600, the pixel data values 206 contain the complete rendered page 500. The pixel data values 206 may then be sent to the printer engine module 195 for printing to the print media 202.

Identifying Regions

For pixel-parallel rendering of the pixels in a region where each thread renders a single pixel, the number of threads needs to be predetermined, so that the GPU kernel knows how many threads are required to run on massively parallel cores on the GPU (e.g., 172). Thus, the boundary of a region needs to be identified for pixel-parallel rendering. The boundary of a region may be identified for pixel-parallel rendering using a sorted edge matrix 820 shown in FIG. 8D to identify the right edge of the region.

Figure 8A:
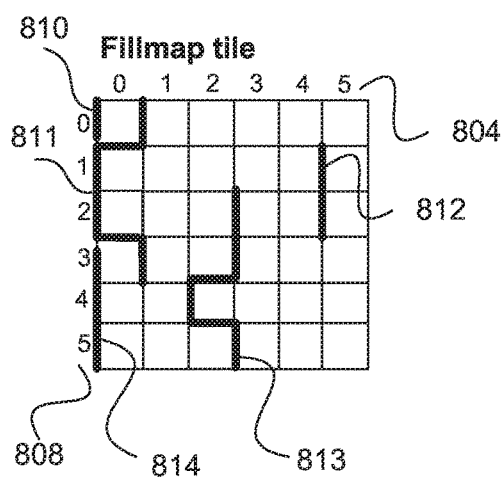
FIG. 8A shows an example of a fillmap tile.
Figure 8B:
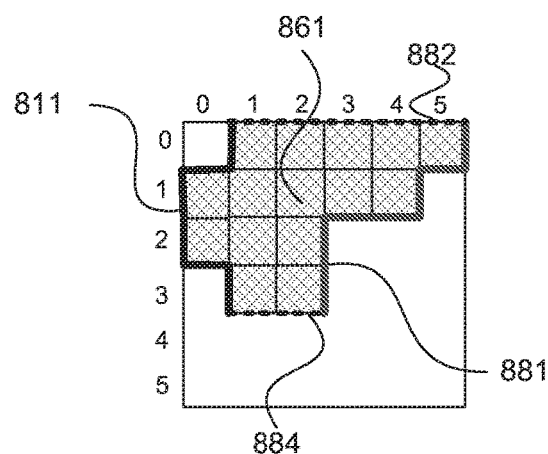
FIG. 8B shows an example of a non-rectangular region from the fillmap tile in FIG. 8A.
Figure 8C:
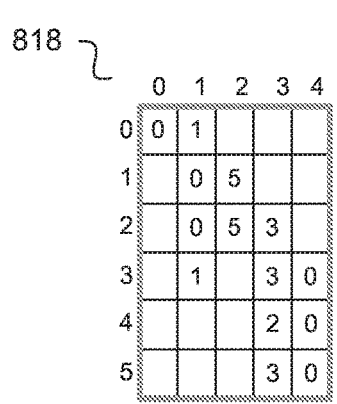
FIG. 8C shows an edge matrix for the fillmap tile in FIG. 8A.

FIG. 8A, FIG. 8B, FIG. 8C, FIG. 8D and FIG. 8E show an example of regions and region data derived from a sorted edge matrix. Fillmap tile 810 in FIG. 8A has six (6) pixels wide by six (6) pixels high. The fillmap tile 810 has five edges 810-814. The edges 810-814 are referenced by edge indices. For example, edge 810 is edge 0 and edge 814 is edge 4. The order of edge indices is the order of edges in the original fillmap representation 402 (e.g., the fillmap representation 560) where the edges are ordered by the starting y-coordinate. The x-coordinates of the edges are described by horizontal indices 804 and the row indices are indicated by vertical indices 808. An example of an edge matrix 818 representing the edges in the fillmap tile 810 is shown in FIG. 8C. Each column of the matrix 818 contains an edge. The columns in the edge matrix 818 are ordered by the start y-coordinates of the edges. However, the x-coordinates in a row are not ordered.

Figure 8D:
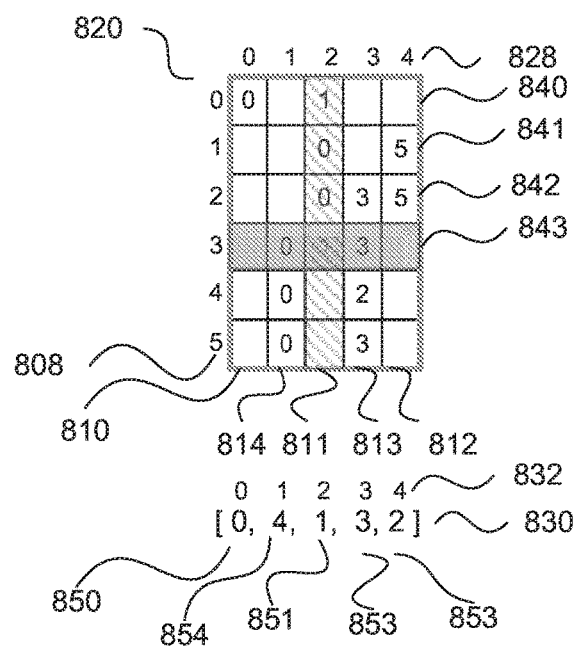
FIG. 8D shows a sorted edge matrix and a sorted edge index list for the fillmap tile in FIG. 8A.

A sorted edge matrix 820, as seen in FIG. 8D, is generated based on x-values of edges in an edge matrix 818 that intersect an edge start scan line corresponding to a start coordinate of the edge. In some implementations, the start x-value of the edge is compared with other x-values on left from the edge start coordinate in the edge start scan line, and the left most column containing an x-value that is greater than the start x-value of the edge is determined as a new location. The edge (i.e., the whole column in the edge matrix 818, alternately referred to as the partition) is moved to the determined location such that the x-values to the left of the original location of the edge along the edge start scan line are monotonically increasing. Because edges are non-intersecting, identifying a column where to move the edge based on the edge start coordinate in this fashion guarantees that edges along all scan lines are sorted, up to the original location of the edge. When sorting of all edges is complete, all x-values along all scan lines are sorted.

A region 861 shown in FIG. 8B for a selected edge 811 is defined by four sides:
 a) a left boundary 811 consisting of the selected edge;
 b) a right boundary 881 which, for each row within the rows spanned by the selected edge, consists of the next edge to the right of the selected edge on the same row, or the right edge of the tile if there are no other edges to the right of the selected edge;
 c) a top boundary 882 from the top of the selected edge to the top of the right boundary; and
 d) a bottom boundary 884 from the bottom of the selected edge to the bottom of the right boundary.

For example, a region 861 has a left boundary defined by the edge 811 and a right boundary 881 formed by the last pixel of the first row at (5, 0), edge 812 at (4, 1) and edge 813 at (2, 2) and (2, 3).

Figure 7:
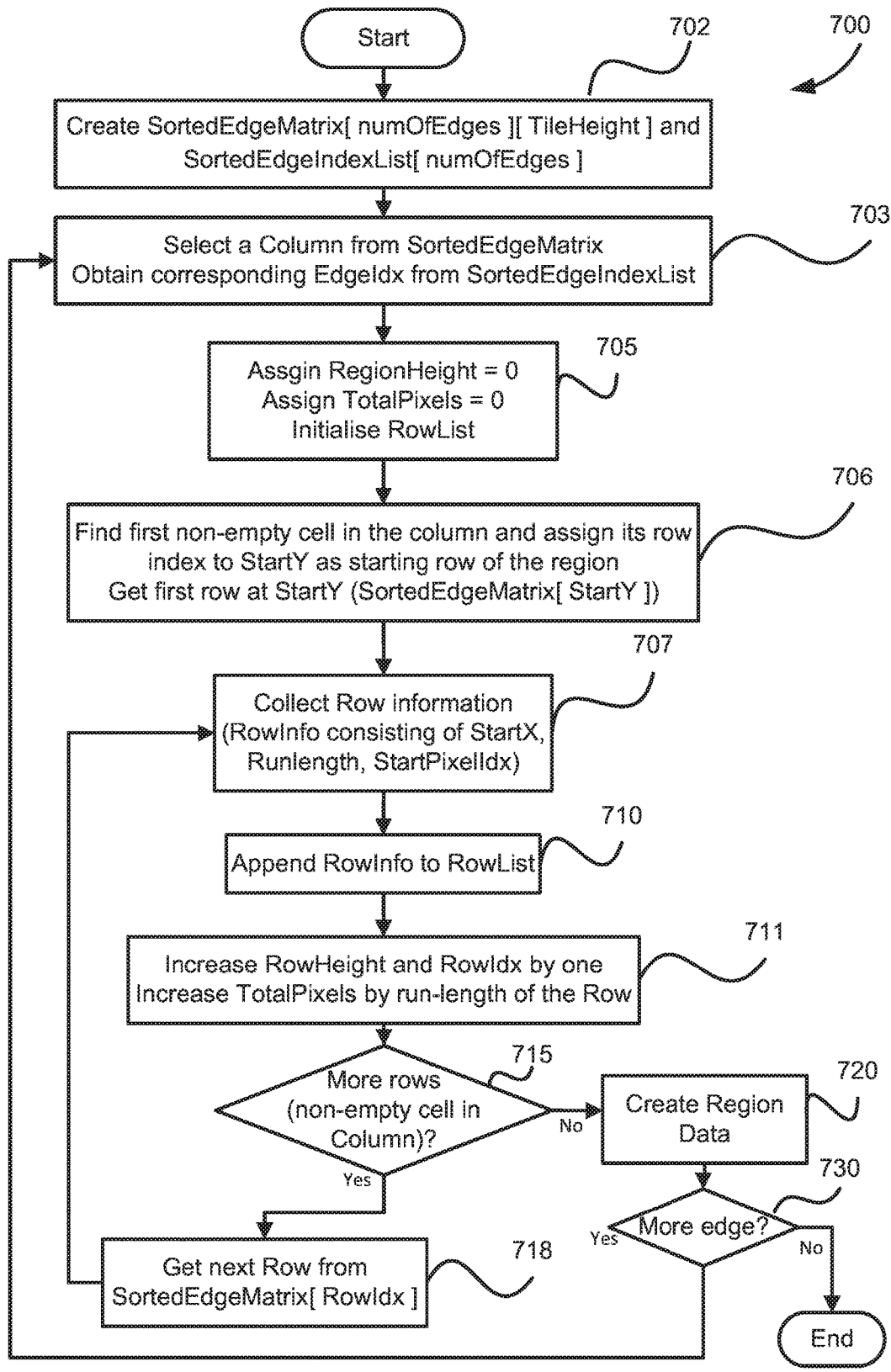
FIG. 7 is a schematic flow diagram showing a method of identifying regions of a tiled fillmap representation.

The method 700 of identifying regions of a tiled fillmap representation 402, as executed at step 604, will now be described with reference to FIG. 7. The method 700 may be implemented as one or more software code modules of the controlling program 181 resident in the memory 190 and being controlled in its execution using a combination of the CPU and GPU controller processors 170. As described in detail below, the method 700 identifies a plurality of run lengths for all rows (or scan lines) of a region.

The method 700 will now be described by way of example with reference to FIG. 8A to FIG. 8E. FIG. 8A shows a fillmap tile 810. The method 700 identifies regions within the tile 810 selected at step 602. In one arrangement, the method 700 is executed within the fillmap renderer module 403. In an alternative arrangement, the method 700 can be executed by the fillmap builder module 401 and the region data is stored in the tiles of the fillmap representation 402. When the fillmap renderer module 403 reads the fillmap tile 810, the region data can be obtained.

The method 700 begins at creating step 702, where a sorted edge matrix, SortedEdgeMatrix 820, and a sorted edge matrix index list, SortedEdgeIndexList 830, as shown in FIG. 8D are created, under execution of the controller processors 170. The matrices, SortedEdgeMatrix 820 and SortedEdgeIndexList 830, are created by rearranging the columns of the edge matrix 818 so that the x-coordinates in each row are ordered ascendingly. The matrix, SortedEdgeMatrix 820, has a number of columns equal to the number of edges and a number of rows equal to the height of the tile 810 as selected at step 602. A column in the matrix, SortedEdgeMatrix 820, describes an edge and the matrix, SortedEdgeMatrix 820, contains x-coordinates in the corresponding rows of the edge. Columns 810, 814, 811, 813 and 812 are referenced by column indices 828 while rows are referenced by row indices 808. The values of non-empty cells in a column represent the x-coordinates of the corresponding edge at each of the consecutive rows. For example, edge 811 has coordinates 1, 0, 0 and 1 in rows 840-843, respectively.

The columns of the matrix, SortedEdgeMatrix 820, are sorted such that the non-empty values in every row are in ascending order. For example, values 0, 5 in row 841, and 0, 1, 3 in row 843.

The list, SortedEdgeIndexList 830, maps column indices of the matrix, SortedEdgeMatrix 820, to edge indices defined in the fillmap tile 810. The size of the list, SortedEdgeIndexList 830, equals the number of edges. For example, column 2 (i.e., associated with reference 851 in FIG. 8D) corresponds to edge 811 having edge index 1.

Note that the order of the columns in the matrix, SortedEdgeMatrix 820, might not be the same as the order of the edges (i.e., associated with references 810-814 in FIG. 8A) in the fillmap tile 810 which are ordered based on starting coordinates of the edges (i.e., associated with reference 810-814 in FIG. 8A). The mapping of the column indices 828 (or indice 832) to the edge indices 850-854 is captured in the list, SortedEdgeIndexList 830. For example, at row 843, columns 1, 2 and 3 map to edge 4 (i.e., associated with reference 854 in FIG. 8D), edge 1 (i.e., associated with reference 851 in FIG. 8D) and edge 3 (i.e., associated with reference 853 in FIG. 8D), respectively.

Since each edge in a fillmap tile corresponds to a region, the method 700 identifies regions in the fillmap tile by iterating over the edges. After creating the matrix, SortedEdgeMatrix 820, and the list, SortedEdgeIndexList 830, in step 702, the method 700 proceeds to selecting step 703. At step 703, the next unprocessed column in the matrix, SortedEdgeMatrix 820, is selected under execution of the processors 170. Using the column index of the column, the corresponding edge index may be maintained by indexing the list, SortedEdgeIndexList 830, with the column index. The edge index is required to determine the compositing stack associated with the region represented by the edge associated with the current column.

Figure 8E:
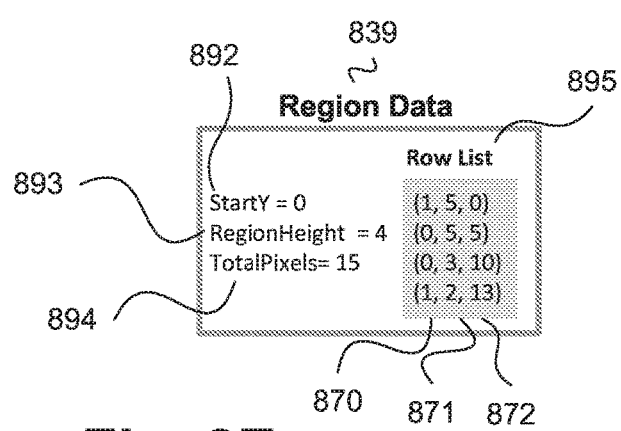
FIG. 8E shows region data on central processing unit (CPU) memory for a non-rectangular region in FIG. 8B derived from a sorted edge matrix in FIG. 8D.

Processing then continues to selecting step 705, where data, RegionData 839, as seen in FIG. 8E for the region (i.e., the region represented by the edge associated with the current column) is created. Within the data, RegionData 839, for the current region, a variable RegionHeight 893 for the number of rows over which the region extends is initialised to zero. Another variable TotalPixels 894 for the total number of pixels in the region, is also initialised to zero, and a data structure comprising a list of per row information, RowList 895, is created. The RowList 895 data structure is derived from a run-based representation of the region. The RowList 895 data structure contains row indices referring to the rows in the region. The final values of the variables TotalPixels 894 and RowList 895 will be part of the region data passed to the GPU for pixel-parallel rendering.

The method 700 then continues to finding step 706 where the row index of the first non-empty cell of the selected column is found and assigned to a variable StartY as the first row of the region for the edge corresponding to the selected column A variable RowIndex is also initialised to an offset value represented by variable, StartY, the index of the first row of the region, and a variable, RowInfo, is created for storing information about the current row of the region. The variable, RowInfo, consists of: StartX, the start x-coordinate of the row; RunLength, the number of pixels in the current row of the region; and StartPixelIndex, the total number of pixels in the previous rows of the region. The variables RowIndex, RowInfo, RunLength and StartPixelIndex and their usage will be described later with reference to FIG. 12 and FIG. 15.

Processing then loops over the rows of the region to collect the RowList information for each row. From step 706, processing proceeds to collecting step 707. As step 707, information for the current row of the region is collected under execution of the controller processors 170. At step 707, the start x-coordinate for the row is assigned to variable, RowInfo.StartX 870. Then, the x-coordinate of the right boundary of the current region on the current row is determined by searching for the next non-empty cell in the current row of the matrix, SortedEdgeMatrix 820. From the right boundary location, the number of pixels in the current row of the region, referred to as the run length, is determined and assigned to RowInfo.Runlength 871. Finally, the value of variable, TotalPixels 895, representing the running total of the run lengths of all previous rows in the current region, is stored to RowInfo.StartPixelIndex 872 under execution of the controller processor 170.

By way of example, consider processing of row 3 (843) of column 2 (811) corresponding to edge index 1 (851). Rows in the matrix, SortedEdgeMatrix 820, correspond to scan lines in the tile 810, e.g. row 3 (843) corresponds to a scan line 3 in the tile 810. The matrix, SortedEdgeMatrix 820, entry indicates the start position of the region on the current scan line. The start position in the example of FIGS. 8A to 8E is equal to one (1). Thus variable, RowInfo.StartX, is assigned the value one (1). Also at step 707, the end of the region on the current scan line is determined by searching for the next non-empty cell of current row 843. As the value of the next cell to the right in column 813 is not empty, the search stops and the value three (3) is read. The run length of the current row assigned to the variable, RowInfo.Runlength 871, is 3−1=2. Empty cells are skipped during the process of searching the next edge in the row. If the rest of the cells in a row are all empty cells, as would be the case for column 2 (811) and row 0 (840), the right edge of the region in the row is the fillmap tile width minus one. In the latter example, the right x-coordinate for row 0 840 is the tile width minus one 6−1=5. Returning to the example of row 3, column 2, the value of the variable, RowInfo.StartPixelIndex 872, is assigned the total number of pixels of the previous rows the variable, TotalPixels 894, which in this example, is equal to thirteen (13).

Upon completion of collecting all information for a row at step 707, the method 700 proceeds to appending step 710. At step 710, the value of the variable, RowInfo, is appended to the list, RowList 895, under execution of the controller processors 170. Then at increasing step 711, the values of index, RowIndex, and the variable, RegionHeight 893, are both incremented by one, and the total pixels represented by the variable, TotalPixels 894, is incremented by the run length of the current row.

The method 700 then continues to a decision step 715 to determine if there are more rows for the region, i.e., any remaining non-empty cells in the selected column. If there is another row, processing proceeds to getting step 718 where information for the next row is obtained by indexing the matrix, SortedEdgeMatrix 820, by the index, RowIndex, and a new instance of the variable, RowInfo, is created. Following step 718, processing returns to step 707 for processing the remaining rows of the region (i.e., the region represented by the edge associated with the current column).

If it is determined at step 715, that there are no more rows in the region to process, then the method 700 then proceeds to step 720 where the data collected for the current region is stored in a data structure, RegionData 839 within memory (e.g., within memory 148) of the CPU 171. The data structure, RegionData 839, contains the start row offset value of the variable, StartY, the number of rows, RegionHeight, and the total number of pixels TotalPixels 894 of the region, and the list RowList 895 data collected for the region is stored.

A step of detecting a non-rectangular region can be included in step 711. If the start x-coordinate and the run length of the current row are different from previous row's x-coordinate and run length, a non-rectangular region is detected. A flag indicating a non-rectangular region is set to TRUE. From thereon, the process of detecting a non-rectangular region can be skipped for the current region. In other words, as long as the non-rectangular region flag is FALSE, the process of detecting a non-rectangular region is required.

However, if a non-rectangular region is not detected, the region is considered a rectangular region indicated by the non-rectangular region flag set to FALSE. In this case, the region data in step 720 is simplified with only the variables StartX, StartY, RegionHeight, and Runlength (as region width). The list, RowList 895, and variable, TotalPixels 894, are discarded.

The non-rectangular region flag will be used in the step 640 of the method 600 to decide what GPU rendering method will be used.

Upon completion of creating region data 720 for a current region, the method 700 proceeds to a decision step 730 where the edges remaining to be processed are checked. If all edges are found to have been processed, the method 700 ends. Otherwise, the method 700 returns to the step 703 to create the data for another region.

The method 700 is invoked when the number of edges does not exceed a threshold or other rules that allow the rendering of a region by GPU 172 more efficient than rendering by CPU 171.

Rendering a Region on GPU

The method 900 of rendering a region of a fillmap tile, using pixel-parallel rendering, as executed at rendering step 640, will now be described with reference to FIG. 9, FIG. 11, FIG. 13 and FIG. 15. The method 900 may be implemented as one or more software code modules of the controlling program 181 resident in the memory 190 and being controlled in its execution using a combination of the CPU 171 and GPU 172 of the controller processors 170.

The method 900 begins at copying step 901, where some region data 839 stored on the CPU memory 148 of the CPU 171 in the method 700 is copied to the GPU memory 330 of the GPU 172, under execution of the controller processors 170. As a region can be rectangular or non-rectangular, a region data contains different information that will be used by different rendering methods on the GPU 172. A rectangular region data contains only a coordinate (StartX, StartY) of the first row of the region and the region dimensions (number of pixels in a row as the width and number of rows as the height of the region). A non-rectangular region data 839 is defined by values of the variables StartY, RegionHeight, TotalPixels 894 and a RowList 895 which were described previously with reference to FIG. 8A to FIG. 8E.

For a non-rectangular region, each row in the list, RowList 895, consists of three elements corresponding to StartX 870, Runlength 871 and StartPixelIndex 872. However, when copied to the GPU 172, the Runlength field may be omitted because the rendering process running on the GPU 172 does not use the value of Runlength field according to one pixel-parallel region rendering (PPRR) arrangement. FIG. 12B shows a RegionData 1252 stored on the GPU 172.

When a GPU is in a discrete card, data transfer time between the CPU and the GPU depends on the hardware of the interface between CPU and GPU. For example, a PCIe 3x's memory bandwidth is double that of a PCIe 2x's, which is about 8 GB/s maximum. However, some computer systems have shared memory that allows the CPU memory address to be mapped to the memory address of the GPU, or vice versa. The mapping time is much faster than data transfer time.

The method 900 proceeds to copying step 902, where the compositing stack data to render the region is prepared for GPU rendering and then copied to the GPU memory 330, under execution of the controller processors 170. The format of the compositing stack data will be described below with reference to FIG. 10.

The method 900 then proceeds to a decision step 925 to check whether the region to be rendered is a rectangular region. If the region is rectangular, the method 900 continues to rendering step 980 to start rendering the rectangular region. Otherwise, the processing continues to preparing step 930 where data required for pixel-parallel rendering of a non-rectangular region is prepared on the GPU 172. A method 1100 of preparing GPU data for rendering of a non-rectangular region, as executed at step 930, will be described in detail below with reference to FIG. 11. Upon completion of the step 930, the method 900 proceeds to the next rendering step 940 to start rendering the non-rectangular region to an output buffer 1230 as shown in FIG. 12C. The output buffer 1230 contains rendered pixel colours for all pixels in the region. In FIG. 12C the indices of the elements of the output buffers correspond to pixel enumerations 1240. For example, in FIG. 12A pixel 1260 at (4, 1) in a fillmap tile 1210 has pixel index 9 (also shown in FIG. 12C). That is, if all pixel runs of the region are arranged in a sequence starting from the first scan line of that region, the position of each pixel in that sequence can be considered as a pixel index.

The CPU 171 launches asynchronous calls to the GPU rendering functions in steps 940 and 980 which are executed on the GPU 172, and the CPU 171 can continue executing other instructions while the GPU 172 is rendering. Upon completion of the rendering on the GPU 172, the rendered pixels are on the GPU memory 330 of the GPU 172. A method 1300 of rendering a region in a fillmap tile, as executed at step 940, will be described in detail below with reference to FIG. 13.

As described in step 670, the rendered pixels are copied or mapped back to the CPU 171 when all non GPU suitable regions are rendered on the CPU 171. As the output buffer 1230 on the GPU 172 has a compact format for rendering a non-rectangular region, the copying time from the GPU 172 to the CPU 171 is kept to a minimum. However, the rendered pixels need to be copied to the corresponding positions in the output buffer on the CPU 171 using the data, RegionData 839, which includes the run-lengths of the rows 871. Each row of the region is copied to the corresponding position in the output buffer by the row index plus the value of the variable, StartY, for the y-coordinate and the value of the variable, StartX, of the row for the x-coordinate, for a number of pixels specified by the Runlength field in the row.

Compositing Stack Data Structure

The existing format of the compositing stacks in the fillmap representation is suitable for sequential processing when rendering a fillmap tile. For highly parallel GPU execution, the format of the compositing stacks needs to be transformed into a simple data structure where the rendering and compositing information can be easily and quickly accessed without too many branch statements to avoid branch divergence.

Figure 10:
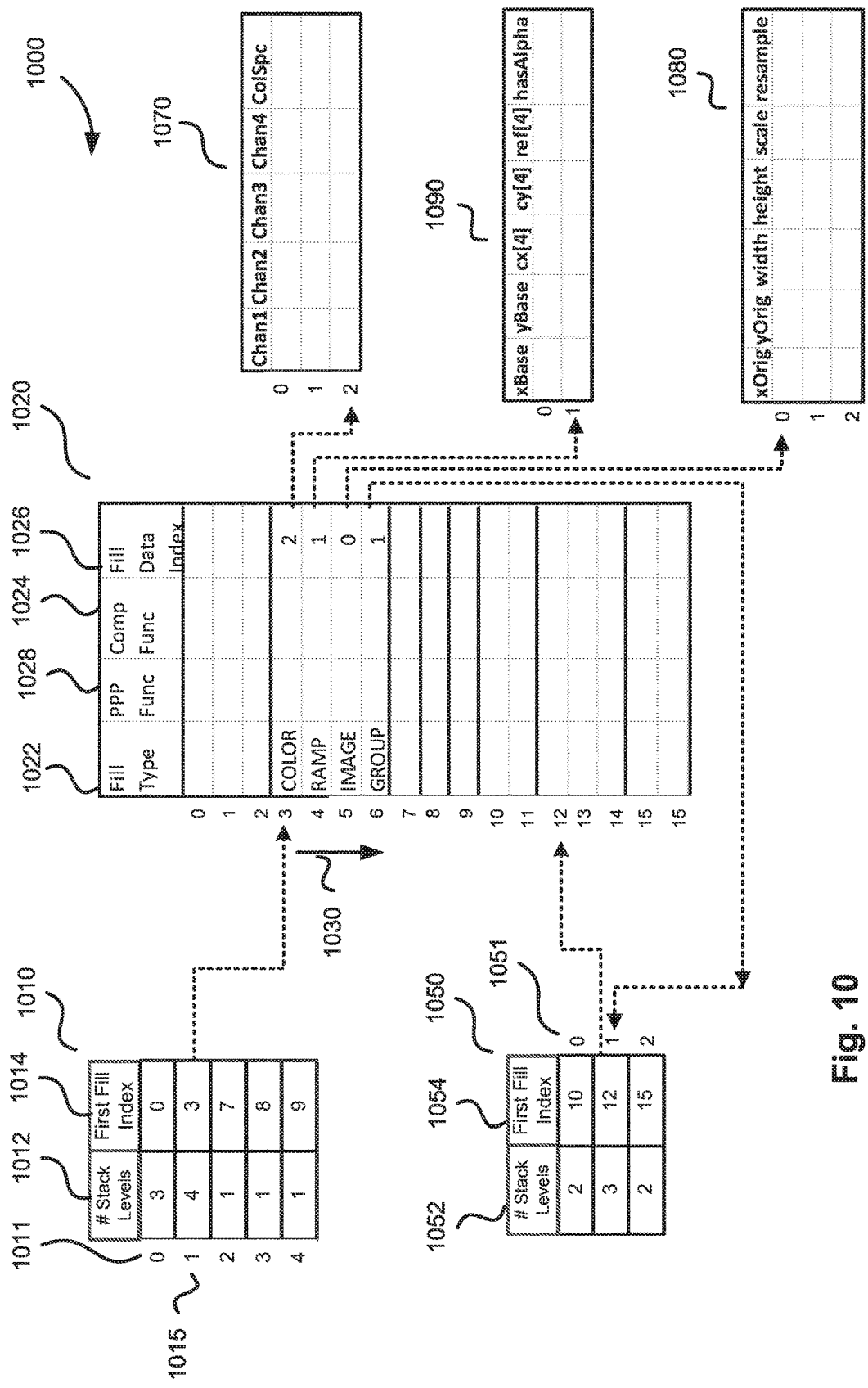
FIG. 10 shows data structures for compositing stacks used for rendering regions on a GPU.

A data structure 1000 for the compositing stacks for the regions in a fillmap tile is described with reference to FIG. 10. The data structure 1000 is defined with the following tables:

1) Compositing Stack table 1010
2) Level Appearance Table 1020
3) Flat Colour Rendering Table 1070
4) Ramp Colour Rendering Table 1090
5) Image Rendering Table 1080
6) Group Rendering Stack 1050

The Compositing Stack table 1010 has one column 1012 indicating the number of level appearances and another column 1014 for the index to the first fill element in the Level Appearance Table 1020. Each row corresponds to an edge/region. The indices 1011 of the compositing stack table 1010 are the edge indices 850-854. For example, the second row 1015 of the Compositing Stack Table 1010 is for edge 1 (i.e., associated with reference 811 in FIG. 8B) which corresponds to region 861 in FIG. 8B. The compositing stack for the region contains four level appearances starting from index 3 to index 6 in the Level Appearance table 1020 in a top to bottom direction 1030.

The Level Appearance Table 1020 contains rendering and compositing information with the following columns:

a) Fill Type column 1022 indicates which rendering table to use. Example fill types include flat colour fill (uniform colour), ramp fill (a colour gradation) and image fill. Each fill type (fill with a bitmap) is associated with a rendering table, i.e., Flat Colour Rendering Table 1070, the Ramp Colour Rendering Table 1090, the Image Rendering Table 1080 and the Group Rendering Table 1050. If the fill type is COLOUR, the Flat Colour Rendering Table 1070 is used for rendering. More fill types and associated rendering tables could be defined.

b) Fill Data Index column 1026 has the index to the corresponding rendering table For example, the first COLOUR fill type in row 3 of the Level Appearance Table 1020 has a FillDataIndex of 2, which is used as the index to the third colour in the Flat Colour Rendering Table 1070, while in row 5 of the third fill type, IMAGE fill, associates the level appearance with the first element (index 0) in the Image Rendering Table 1080.

c) Pre-Post-Processing (PPP) Function column 1028 defines one or more functions, such as colour conversion function or dithering, that need to be executed before or after the rendering and compositing. A colour conversion function from RGBA to CMYK might also be defined in the PPP Function column 1028.

d) Compositing Function column 1024 indicates what compositing function to use and a number of operands. Compositing functions include the Porter-Duff compositing operators. There are two operands: source colour and destination colour, where the source colour corresponds to the colour rendered by the rendering function defined in the same row, and the destination colour is the resultant colour from rendering previous level appearances, which will be described in more detail below with reference to FIG. 15.

More columns could be added to the Level Appearance Table 1020, e.g., number of ROPs (Raster OPerators).

The Flat Colour Rendering Table 1070 defines four channels of colour components which might correspond to RGBA, CMYK or others, and a colour space type. If the colour space type is RGBA, variables Chan1, Chan2, and Chan3 store the red, green, and blue channels respectively, and variable Chan4 stores an alpha (or opacity) channel. The Flat Colour Rendering Table 1070 can be extended with more channels. Alternatively, a Flat Colour Table with different number of channels could be split into separate tables. For example, the COLOUR fill type might be changed to COLOUR4 and COLOUR6 corresponding to a 4-channel flat colour rendering table and a 6-channel flat colour rendering table.

The Ramp Colour Rendering Table 1090 has several columns defined for parameters used to calculate a pixel colour at pixel position (x, y). The pseudocode to calculate the pixel colour is listed below:

```
deltaX = x − xBase
deltaY = y − yBase
rampColour[0] = (int)(deltaX * cx[0] + deltaY * cy[0] + ref[0])
rampColour[1] = (int)(deltaX * cx[1] + deltaY * cy[1] + ref[1])
rampColour[2] = (int)(deltaX * cx[2] + deltaY * cy[2] + ref[2])
IF (hasAlpha)
   THEN
      rampColour[3] = (int)(deltaX * cx[3] + deltaY * cy[3] + ref[3])
   ELSE
      rampColour[3] = 255
```

As different gradient colour formulas such as radial gradient require different parameters, a different rendering table with different parameters may be defined.

The Image Rendering Table 1080 defines the image portion that will be used to calculate a pixel colour. A whole image or a portion of an image may be transferred to the GPU 172. If a portion, e.g., a band or a strip, is used, the coordinate (xOrig, yOrig) defines the origin of the image band, and the coordinates (width, height) corresponds to the dimensions of the image band. The table 1080 also has a column for a scaling factor to apply to the image and another column for a re-sampling or interpolation mode, e.g., linear interpolation or cubic-interpolation. As the architecture of the GPU 172 has special texture units, hardware acceleration of the image scaling might be advantageous. However, the rendering quality needs to be checked. If the rendering quality does not meet expectations, the image scaling kernel function needs to be rewritten for more precision and border checking on the GPU.

The Group Rendering Table 1050 has similar columns to the Compositing Stack Table 1010, where the first column 1052 contains the number of level appearances or number of elements in the Level Appearance Table 1020 and the second column 1054 contains the Fill Data Index referencing the Level Appearance table 1020. Each entry in the Group Rendering Table 1050 represents a sub-compositing stack that is referenced by a Fill Data Index 1026 from the Level Appearance Table 1020. While the indices 1011 of the Compositing Stack Table 1010 correspond to the edge indices, the indices 1051 of the Group Rendering Table 1050 are numbers from the Fill Data Index column 1026 in the Level Appearance Table 1020. For example, the fourth fill type (at index=6) in the Level Appearance Table for region 1 (861) is GROUP and its associated group in a compositing stack is defined by the second element (indexed by 1) in the Group Rendering Table 1050. The compositing stack or sub-compositing stack has three level appearances starting from $13^{th}$ element (index 12) in the Level Appearance Table 1020. The rendering of a GROUP fill type is a recursive call of the pixel rendering that will be described with reference to FIG. 15.

The Group Rendering Stack table 1050 may be merged with the Compositing Stack table 1010 in one arrangement.

Preparing GPU Data for Non-rectangular Region Rendering

The method 1100 of preparing GPU data for rendering a non-rectangular region on the GPU will now be described with reference to FIG. 11 and FIG. 12. The method 1100 may be implemented as one or more software code modules of the controlling program 181 resident in the memory 190 and being controlled in its execution using a combination of the CPU 171 and GPU 172 of the controller processors 170. The method 1100 will be described by way of example with reference to FIGS. 12A to 12E and, in particular, the example non-rectangular region 1210 of FIG. 12A. The method 1100 is used for rendering a determined region using a plurality of threads. As the number of pixels in each row of a region may not be same or the leftmost pixel x-value in each row of the region may not be same, it is not trivial to map the parallel thread indices to the corresponding pixel coordinates in the region in a single instruction, multi data (SIMD) programming model in a general purpose GPU (GPGPU) environment. The method 1100 establishes a relationship between the pixels and the threads. As described below, a reference is created for at least one of the threads rendering a pixel on a scanline of a determined region to another of the threads rendering the first pixel on the scanline.

The pixels in a region are enumerated sequentially and continuously numbered from left to right in each row and from the top row to the bottom row, as shown by the example region 1210 in FIG. 12A. Each pixel thus has an associated identifier referred to as a pixel index. For each pixel in a region, coordinates for placing the pixel are determined. The leftmost pixel of the first row in the region 1210 has pixel index zero (0), the next pixel has pixel index one (1), and so on. If there are no pixels to be numbered in a row of the region, the next pixel is the leftmost pixel on the next row. Indices for output buffer 1240 correspond to respective pixel indices for the region 1210. For example, pixel 1260 at coordinates (4, 1) has pixel index 9 in region 1 (i.e., associated with reference 861 in FIG. 8B) with edge 1 (i.e., associated with reference 811 in FIG. 8B) as the left boundary. The pixel 1260 (referred to as pixel 9) is rendered by a thread with thread index 9 (referred to as thread 9). The rendering of a pixel will be described with reference to FIG. 17.

Figure 9:
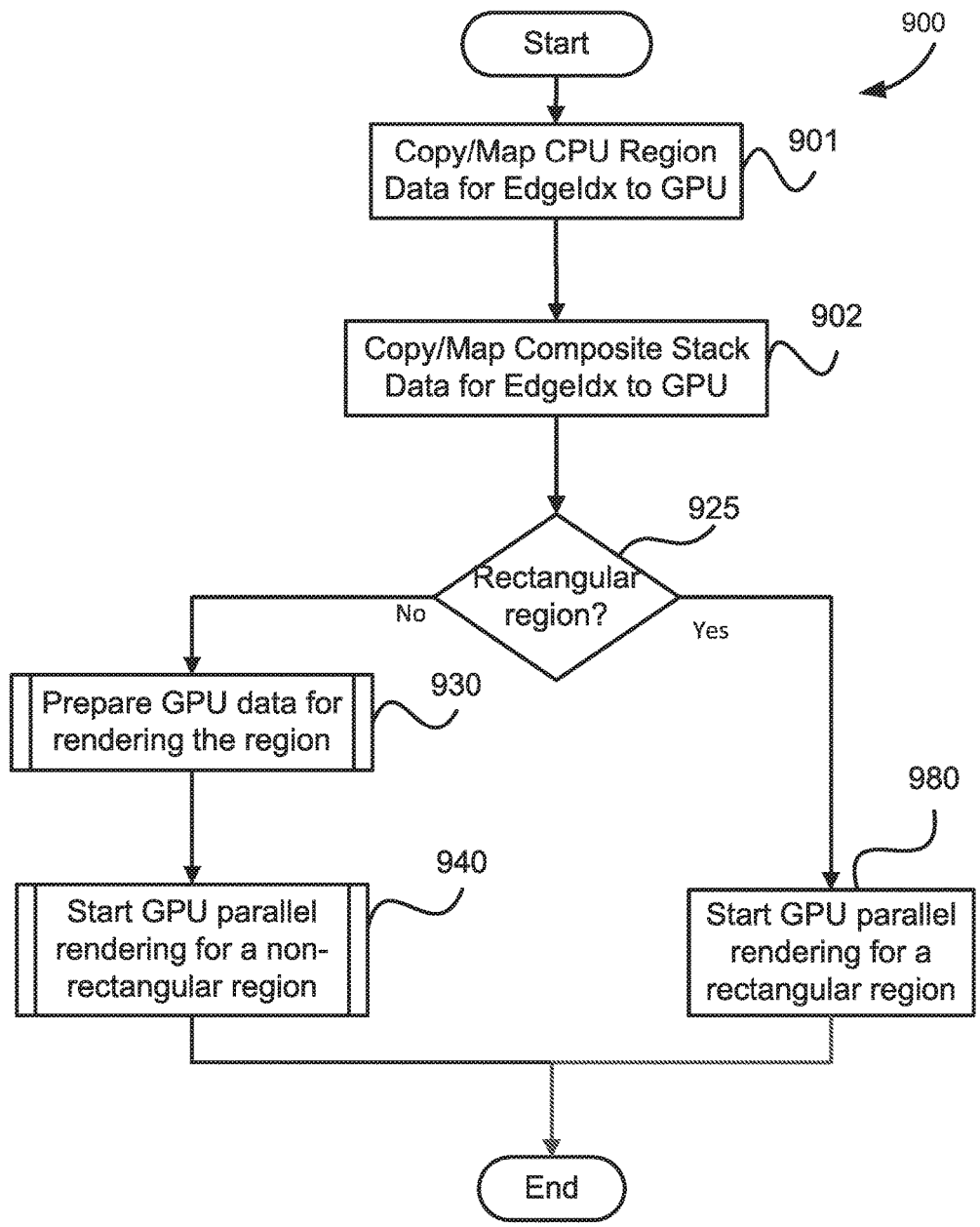
FIG. 9 is a schematic flow diagram showing a method of rendering a region of a fillmap tile using pixel-parallel rendering.

As described in step 901 of FIG. 9 and the example in FIG. 8E, the data, RegionData 1252, that is copied to the GPU 172 comprises: StartY 892, the start row of the region in the SortedEdgeMatrix; the number of rows RegionHeight 893; TotalPixels 894, the total number of pixels in the region; and Row List 895, consisting of the start x-coordinate StartX 1250 and the start pixel index, StartPixelIndex 1258, for each row of the region 1210. The preparation process of step 930 utilises the data, RegionData 1252, on the GPU 172 to create a list, RowIndexList 1280, which is needed for pixel-parallel rendering 940. Note that the data, RegionData 1252, can describe any arbitrary shape and is more flexible than conventional methods that divide a region into rectangular sub-regions.

Figure 11:
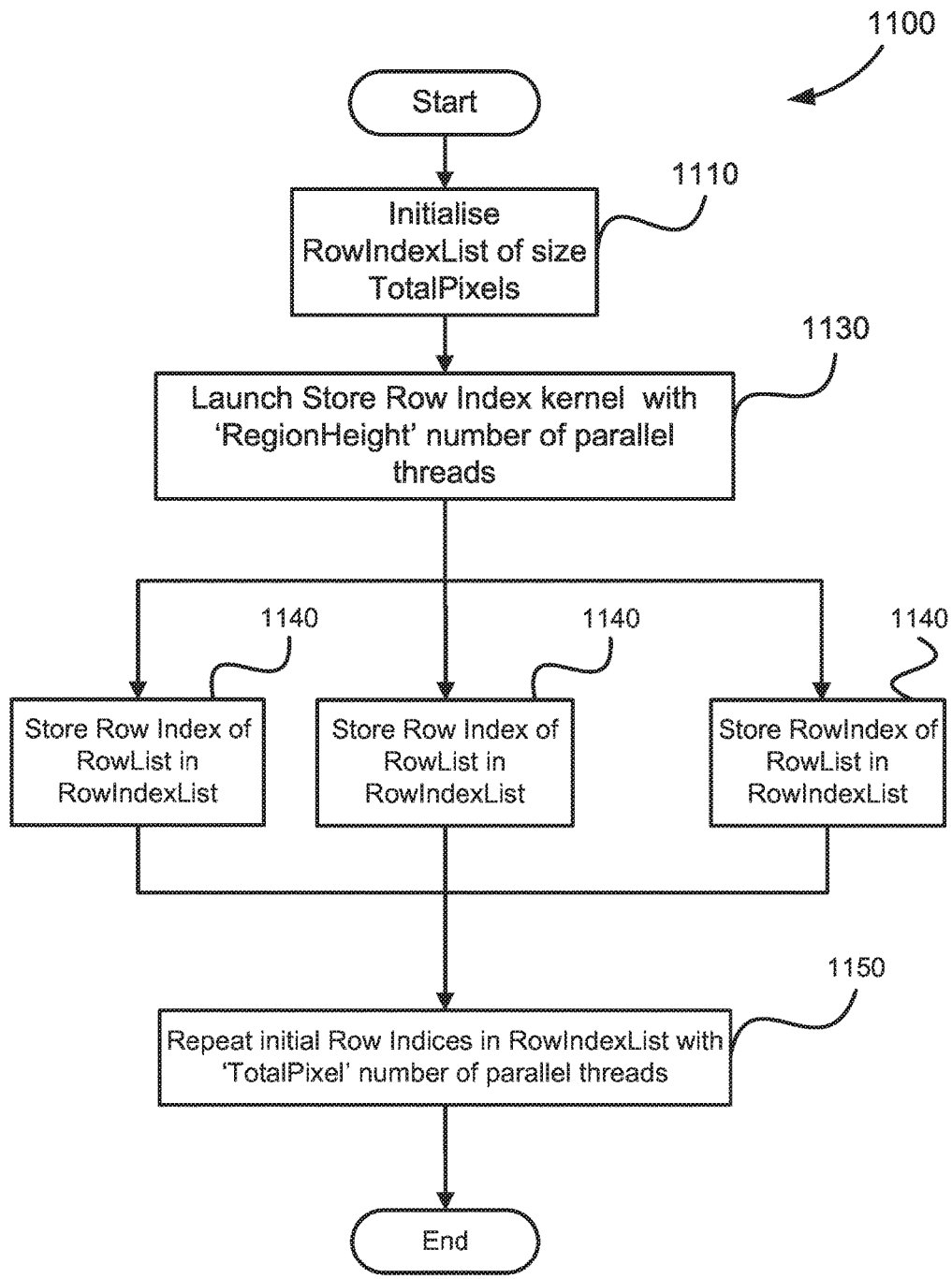
FIG. 11 is a schematic flow diagram showing a method of preparing GPU data for rendering of a non-rectangular region.

The method 1100 of preparing the GPU data required for rendering a region as shown in FIG. 11 starts with initialising step 1110 where a list, RowIndexList, is created with a number of elements equal to the number of pixels in the region on the GPU 172. The number of pixels is obtained from variable, TotalPixels 894, in the data, RegionData 1252. Each element of the list, RowIndexList, is initialised with −1.

For a thread rendering a pixel, a corresponding row (or scan line) to place the rendered pixel is determined using a RowList data structure indexed by a thread identifier in the form of a thread index. The purpose of the list, RowIndexList, is to establish a mapping between a thread index, an associated rendered pixel index and the row (in the RowList) to which the pixel belongs. A thread with an index can use the list, RowIndexList, to get the associated row index, further to obtain the value of the variable, RowInfo, and calculate the pixel position.

Processing then proceeds to launching step 1130, where a GPU kernel, StoreRowIndex( ), with a number of threads defined by variable RegionHeight 893. The CPU process of launching a kernel at step 1130 allows the kernel defined on the GPU 172 to be executed with a number of threads equal to the number of rows in the region. The number of rows is obtained from the variable, RegionHeight 893, in the region data defined by RegionData 1252. If the number of threads (or rows) is less than or equal to the number of GPU cores or processing elements 310 and 320, the threads will be running in parallel. Otherwise, groups of threads will be sequentially scheduled by the scheduler on GPU 340 and executed concurrently. However, threads within any one group are executed in parallel where the term "in parallel" is used in the present description to refer to both threads executed in parallel" and threads executed "concurrently".

Processing proceeds to storing step 1140 where the row indices 1251 of the list, RowList are set in the list, RowIndexList 1280, at positions according to the start pixel indices 1258 defined in the list, RowList 1255. Step 1140 is executed by a GPU kernel, StoreRowIndex( ), by a number of threads specified by the variable, RegionHeight, in RegionData 1252. Each thread sets a row index in the list, RowIndexList, at a position indicated by the start pixel index of the row. Each thread index corresponds to a row index.

The pseudocode of the StoreRowIndex( ) kernel is described below as follows:

```
RowIndex = ThreadIndex
RowInfo = RowList[ RowIndex ]
RowIndexList[ Row.StartPixelIndex ] = RowIndex
```

The thread with an index, ThreadIndex, sets the corresponding row index to one element in the list, RowIndexList. The row index, RowIndex, is the same as the index, ThreadIndex. The variable, RowInfo, from the list, RowList, indexed by the RowIndex has an index, StartPixelIndex, which is used for the position to store the index, RowIndex, in the list, RowIndexList.

The example region 1210 in FIG. 12A has a region with four rows; thus four threads will execute the StoreRowIndex( ) kernel 1140 in parallel. Each thread has an index 1276 representing a row index 1253 and executes an instance of the kernel. The StoreRowIndex( ) function sets a row index 1253 of the list, RowList 895, to an element in the list, RowIndexList 1270, indexed by the index, StartPixelIndex 1258, of the corresponding row. The resultant list, RowIndexList 1270, after step 1140 is executed as shown in FIG. 12D. The elements at indices 0, 5, 10, and 13 (i.e., associated with reference 1258 in FIG. 12B) are updated with the row indices 0, 1, 2, 3, (i.e., associated with reference 1276 in FIG. 12D) respectively (executed by corresponding threads).

Upon completion of the step 1140 for all threads, the method 1100 executed at step 930 proceeds to step 1150 to repeat the row indices in the list, RowIndexList, so as to initialise undefined elements (filled with −1) with the row index to their left. The resultant list, RowIndexList 1280, is shown in FIG. 12E. Step 1150 can be implemented with a parallel scan-max method, where TotalPixels 894 threads are executed in parallel on the GPU.

In another arrangement of the method 1100, step 1150 can be implemented to replace every element with −1 in the list, RowIndexList, with the row index at the index, StartPixelIndex. In other words, after all threads executed the StoreRowIndex( ) function, each thread will iterate elements next to the element indexed by index StartPixelIndex. If the element is −1, it is replaced with the row index. Otherwise, the thread stops iteration. For example, after the StoreRowIndex( ) function executed in all four threads (for four rows), the element at index 5 (StartPixelIndex of row 1) is one (1). Thread 1 (i.e., associated with reference 1276 in FIG. 12D) will iterate over the elements starting from element 6 in the RowIndexList until a non-negative element is found, which is the element 10 containing row index 2. Each of the iterated elements is set with row index 1 (i.e., associated with reference 1251 in FIG. 12B).

Parallel Scan-Max

The objective of the parallel scan-max is to determine the final contents 1280 of the list, RowIndexList 1280, shown in FIG. 12E. The final contents 1280 of the list, RowIndexList 1280, is determined in two phases, an up-sweep and down-sweep. During up-sweep and down-sweep an operator is recursively applied to pairs of cells in the row. The scan operator, max(x, y)=x>y?x:y, is applied to the result of the previous stage in either the up-sweep or down-sweep phase. In transitioning from one state to another, multiple instances of the scan-max operator are applied to one or more pairs of elements in parallel.

The down-sweep phase commences by initialising the final element to the value −2 (or any number less than −1). Initialising the final element produces the first state of the down-sweep phase. The "max" operator is applied in a similar manner during the down-sweep phase, i.e., applied to one or more pairs of the elements in parallel.

GPU Pixel-Parallel Rendering for a Non-Rectangular Region

Figure 13:
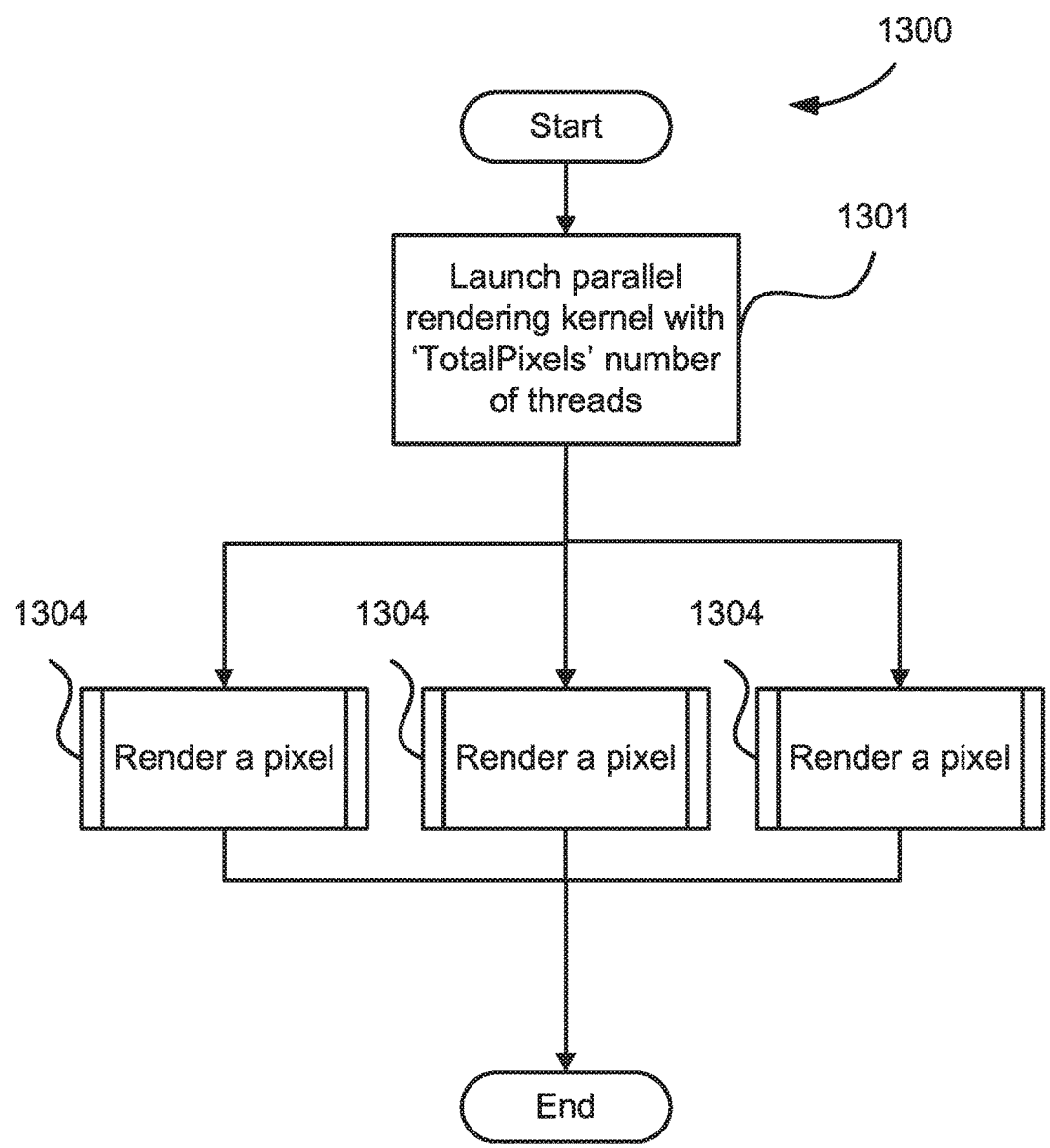
FIG. 13 is a schematic flow diagram showing a method of rendering a region in a fillmap tile.
Figure 14A:
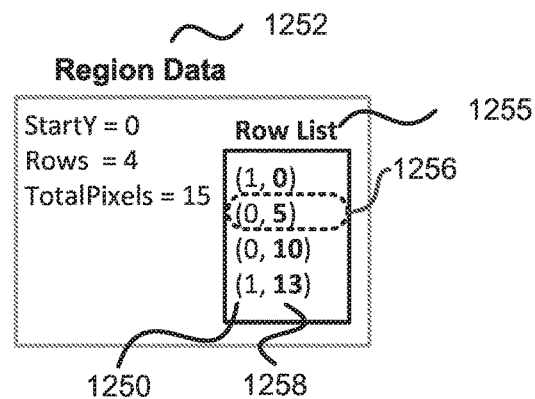
FIG. 14A is an example of region data on GPU memory.
Figure 14B:
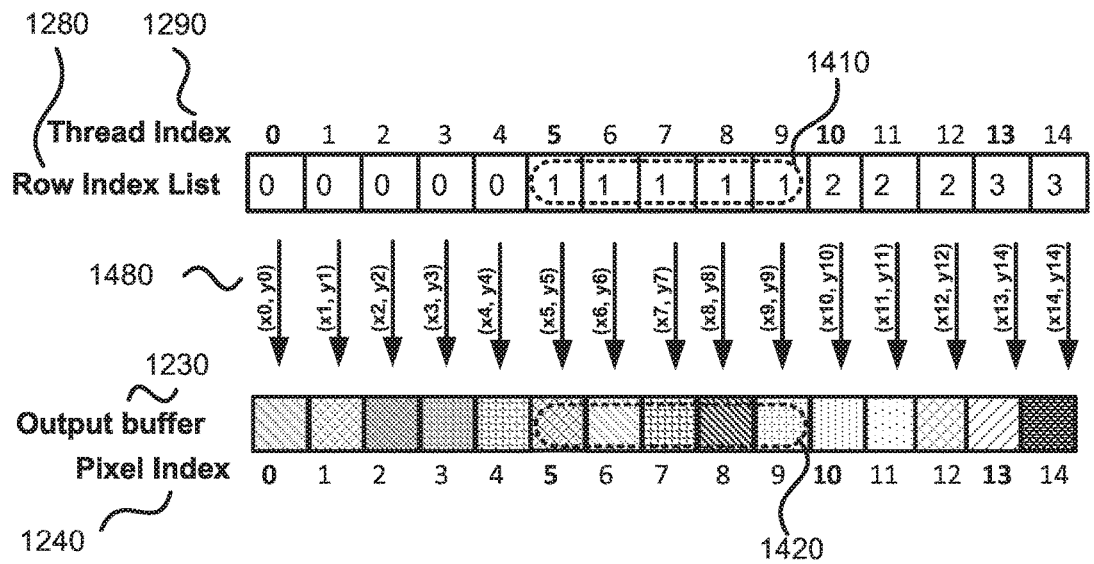
FIG. 14B shows an overview of pixel-parallel rendering for non-rectangular region to an output buffer on a GPU using a row index list.
Figure 14C:
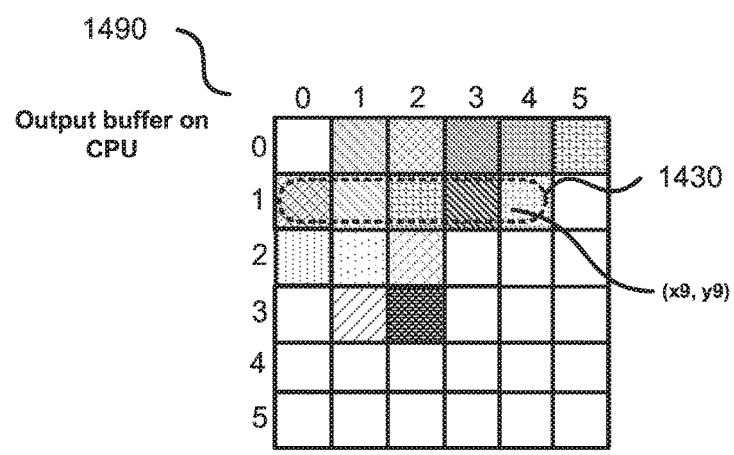
FIG. 14C shows the pixels in the output buffer on a GPU mapped to the output buffer on a CPU.

The method 1300 of rendering a region in a fillmap tile, as executed at step 940, will be described in detail below with reference to FIG. 13. The method 1300 is configured for rendering pixels in a non-rectangular region on the GPU is will be described with reference to FIG. 13, FIG. 14A to FIG. 14C and FIG. 15. FIG. 14A shows an example of region data 1252 on the GPU 172. FIG. 14B shows an overview of rendering pixels onto an output buffer 1230 for a region 861, via a region data 1252 and a row index list 1280, on the GPU 172. FIG. 14C shows an output buffer 1490 on the CPU 171 for a tile that contains the rendered region. As described in detail below, each row index to the RowList in the RegionData may be stored at a number of entries in a list of indices to a set of pixels (or scan line). The list of indices indicates the total number of pixels in the rendered region, the number of pixels corresponding to the number of threads executing concurrently. Each entry referred by the row index from the list of indices to scan lines refers to a coordinate of a first pixel of a row in the rendered region and to the thread index processing the first pixel. The region of the fillmap tile is rendered using a number of parallel threads, the number of threads being equal to the total number of pixels in the rendered region, each thread executing the same rendering function for a corresponding pixel.

For example, each row index in the Row Index List 1280 refers to a row index in the RowList 1255 in the RegionData 1252. The row indices 1410 define rows of the region and can be used, together with StartY variable in the RegionData 1252, to determine a corresponding scan line within a tile. The Row Index List 1280 is further indexed by thread indices 1290. Thus, when a particular thread is rendering a pixel, the pixel's row index can be easily identified by looking up the Row Index List 1280 using a corresponding thread index of that thread. The identified row index is used to determine a thread index 1258 rendering the first pixel on a row (or a scan line) of the region corresponding to the identified row index. This information, as described in detail below, is used to find coordinates within a tile of the rendered pixel.

The method 1300 starts at launching step 1301, where a GPU kernel is launched with a TotalPixels 894 number of threads in parallel. The pixel indices 1240 of the output buffer 1230 correspond to the thread indices 1290 that are used to access the list, RowIndexList 1280. The processing proceeds to a parallel step 1304 where each thread will render a pixel at a position (x, y) 1480. Each thread is associated with an identifier of a row on which the thread renders a pixel. When rendering a pixel, the thread needs to know which RowInfo variable must be used because the RowInfo variable has the information to determine the corresponding pixel position (x, y) in the output buffer 1230. For example, the second row in the region 861 is represented by the second RowInfo 1256 variable in the list, RowList 1255. The row index to the RowInfo variable is one (1). As the thread only knows its identity, or thread index, the thread requires an intermediate data, and the list, RowIndexList 1280, to find the row index.

The list, RowIndexList 1280, is prepared in step 930 before the rendering. For example, all threads to render the pixels in the second row have the row index equal to one (1) (see reference 1410 in FIG. 14B) obtained from the Row-IndexList 1280 at the locations indexed by the thread indices. Each thread index 1290 is used to obtain an element of the RowIndexList 1280. The value of the element is a row index to the list, RowList 1255, and is used to fetch the corresponding value of the variable RowInfo 1256.

For each row, an identifier of a thread rendering the first pixel is determined based on an identified plurality of pixel run lengths. In particular, Index, StartPixelIndex 1258, of the RowInfo 1256 equals the thread index of the first pixel of the row indexed by reference 1410 in FIG. 14B. For example, the first thread index of row indices (1's) 1410 in the RowIndexList 1280 for the second row of the region is five (5), which appears in the index, StartPixelIndex 1258, of the RowInfo 1256. The start pixel index 1250 is used to determine the x-coordinate pixel position. The y-coordinate is determined by the row index and the value of the variable, StartY, in the data, RegionData 1252. A method 1600 of determining the pixel position (x, y) will be described in FIG. 16.

The calculation of the pixel position is undertaken at GPU kernel execution time using the data, RegionData 1252, shown in FIG. 14A and the list, RowIndexList 1280, in FIG. 14B. An arrangement using the data, RegionData 1252, shown in FIG. 14A and the list, RowIndexList 1280, is more efficient than storing the pixel position for every rasterised pixel and then restoring the pixel position when rendering the pixel. Because the pixel position is only used once to render the pixel, it is not necessary to store the position in memory. Each rendered pixel colour will be placed in the output buffer 1230 on the GPU 172 at a location determined by indexing the output buffer by the index 1290 of the thread. The thread index 1290 is the same as the pixel index 1240 in the described pixel-parallel region rendering (PPRR) methods. For example, pixels 1420 for the second row of the region 861 in the output buffer 1230 have the same indices as the thread indices.

As every pixel in a region is associated with the same element in the Compositing Stack Table 1010, every thread in the region executes the same instructions to render the pixel associated with the thread.

When rendering pixels to the output buffer on the GPU 172, the pixel position (x, y) is required to render a pixel with the Ramp Colour Render Table 1090 or the Image Render Table 1080. In another arrangement, other fill types may need to know the pixel position (x, y). However, the pixel position (x, y) is not required if only flat colour fills are specified by the compositing stack for the region. In addition, the individual pixel position (x, y) is not required for copying the rendered pixel to the output buffer on the CPU 171 because the region data 839 on the CPU 171 can work out where in the CPU output buffer a rendered pixel should be copied.

As described in step 670, when all pixels in a region are rendered to the output buffer 1230 on the GPU 172, the output buffer is first copied to the CPU 171 as a compact region output buffer and then each row of the region is copied to a location in the output buffer of the tile on the CPU 171. When copying the rendered pixels from the compact region output buffer to the output buffer on the CPU 171, pixels in each row are copied to the corresponding location calculated using the data, RegionData 839, on the CPU 171. The x-coordinate of the first pixel of a row is calculated by the value of the variable, StartX 870, in the RowInfo variable from the list, RowList 890, and the y-coordinate is the row index plus the value of the StartY 890 variable of the data, RegionData 839. A block copy (e.g., memcpy( )) function may be used to copy a number of rendered pixels specified by the value of the Runlegth 871 variable to location (x, y) in the tile's output buffer on the CPU 171. Thus, individual pixel position (x, y) except the first pixel position are not necessary for copying the region output buffer.

In another arrangement, if the computer system 100 has shared memory for the GPU 172 and the CPU 171 (e.g., AMD's Heterogeneous System Architecture supports uniform memory access from CPU and GPU), the rendered pixels can be written to the tile's output buffer 1490 directly. Thus, the output buffer 1230 on the GPU 172 is not required. However, the pixel position (x, y) is needed to place the rendered colour of the pixel in the output buffer on the CPU 171. For example, each pixel in the second row 1430 is placed in the output buffer 1490 individually using the pixel position (x, y). The last pixel rendered by thread 9 is placed at (x9, y9), or (4, 1) which is determined at step 1501. A method of rendering a pixel by a thread, as executed in the step 1304, will now be described in more detail with reference to in FIG. 15.

The method 1500 may be implemented as one or more software code modules of the controlling program 181 resident in the memory 190 and being controlled in its execution using a combination of the CPU 171 and GPU 172 of the controller processors 170.

The method 1500 beings at getting step 1501, where the thread index, which is a number between 0 and TotalPixels 894 minus 1, is retrieved under execution of the control processors 170. With OpenCL (i.e., a GPGPU language), a thread index can be obtained via an application programming interface (API) while with CUDA (Compute Unified Device Architecture) a thread index needs to be calculated depending on the configuration of the threads at kernel launching stage. For example, with CUDA, a number of parallel threads are configured as blocks (up to three-dimension) of threads at kernel launching time. The block dimension determines the total threads within a block. Further, the blocks are organised as a grid (up to three-dimensions). At kernel execution time each thread has an index within a block and an associated block index. Thus, a global index of a thread may be determined from the total number of threads in a block, current index of the thread inside the block, and the current block index.

Figure 16:
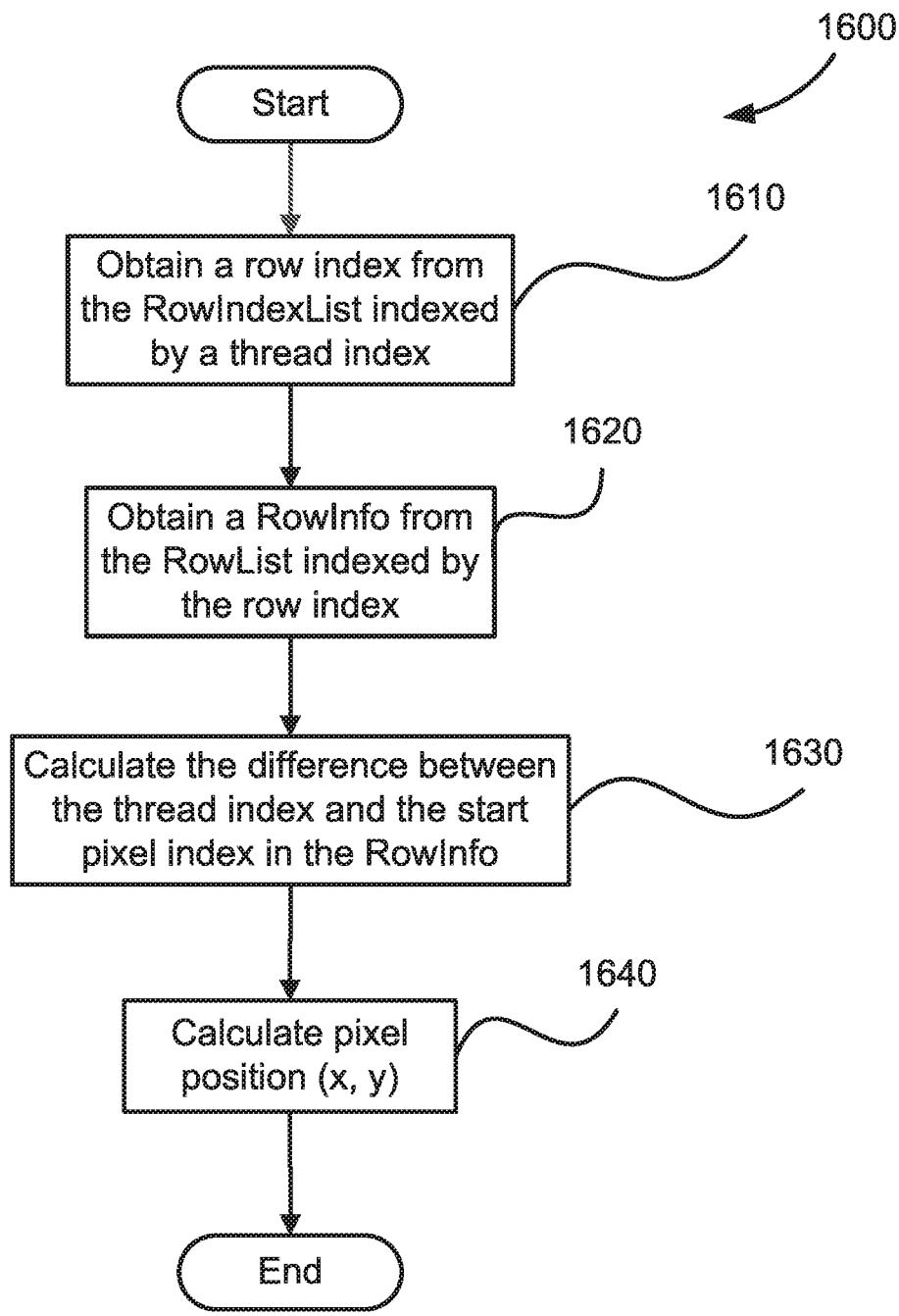
FIG. 16 is a schematic flow diagram showing a method of determining a pixel position.

Processing proceeds to determining step 1502, where the corresponding coordinates (x, y) of the pixel position are determined A method 1600 of determining a pixel position, as executed at step 1502, will be described below with reference to FIG. 16.

Upon completion of the step 1502, the method 1500 proceeds to getting step 1503, where the compositing stack 1015 from the Compositing Stack Table 1010 is obtained to render the pixels in the region 861. The number of level appearances in the compositing stack 1012 is assigned to a variable, Levels.

Then processing continues to selecting step 1504. Step 1504 starts with selecting the first element in the Level Appearance Table referenced by the First Fill Index in the region's compositing stack 1015. Then the pixel at position (x, y) is rendered using the parameters of the indexed entry in a Rendering Table (1080, 1070 or 1090) associated the fill type of the element at the first level. A pre-processing or post-processing function 1028 may also be executed for colour conversion or post-processing. The rendered result is stored in a variable, Colour, as an initial colour of the pixel. The value of the variable, Levels, is decreased by one.

The method 1500 then proceeds to a decision step 1505 to determine whether there are more levels to be composited (Levels is greater than zero). If there are more levels to be composited, processing continues to selecting step 1510, where the next level appearance in the Level Appearance Table 1020, its associated Rendering Table according to the fill type, Compositing Function, and, if applicable, an extra Pre-Post-Processing Function, are selected under execution of the controller processors 170.

Then processing continues to rendering step 1511, where the pixel at (x, y) is rendered using the parameters indexed by the Fill Data Index 1026. The resultant colour is stored at a variable, currColour.

In the case of a GROUP fill type, a sub-compositing stack from the GROUP Rendering Table 1050 is first obtained via the associated Fill Data Index. Then a recursive call of the pixel rendering method 1500 but starting from step 1503 is made. The colour at step 1512 from the recursive call after processing the last level in the sub-compositing stack is assigned to a variable, currColour, as the result of rendering the GROUP fill type.

The method 1500 continues from step 1511 to compositing step 1512 where the previously rendered pixel colour, Colour, is composited with the currently rendered colour, currColour, using a corresponding compositing function 1024. The colour resulting from step 1511 is stored in the variable, Colour. Processing then returns to decision step 1505.

If there are no more levels remaining to be processed at the decision step 1505, processing proceeds to writing step 1520, where the rendered pixel colour, Colour, is written to output buffer 1790 on the GPU 172 or output buffer 1770 on the CPU 171 if the shared memory model is used. The method 1500 concludes following step 1520.

Upon completion of executing all rendering threads in accordance with the method 1500 (i.e., a TotalPixels 894 number of threads), the process of rendering a non-rectangular region 1300 ends upon completion of step 1520.

The method 1600 of determining a pixel position, as executed at step 1502, will now be described in more detail with reference to FIG. 16 and an example in FIG. 17. The method 1600 may be implemented as one or more software code modules of the controlling program 181 resident in the memory 190 and being controlled in its execution using a combination of the CPU 171 and GPU 172 of the controller processors 170.

The method 1600 starts with obtaining step 1610, where a row index, RowIndex, is obtained from the list, RowIndexList, indexed by the thread index, ThreadIndex as follows:

RowIndex=RowIndexList[ThreadIndex]

RowIndex is an index to the RowList data structure 1255. The index, RowIndex, may be different from an index of a scanline of a region. The actual index of the scanline in the region is the RowIndex plus the offset value of the variable, StartY, specified in the data, RegionData 1252. In the example region 1210, as seen in FIG. 12A, the row index to RowList and the scaline index to the tile are the same because the offset value of the variable, StartY, is zero.

Processing proceeds to obtaining step 1620, where a RowInfo 1256 for a row indexed by the index, RowIndex 1410, to the list, RowList 1255, is selected:

RowInfo=RowList[RowIndex]

The RowInfo has a start x-coordinate equal to the value of the variable, StartX 1250, for the selected row and a start pixel index, StartPixelIndex. The start x-coordinate, StartX 1250, and the start pixel index, StartPixelIndex, are used to determine the x-coordinate of a pixel to be rendered by a thread identified by index, ThreadIndex. The variable, StartX, is the x-coordinate of the first pixel in the selected row while the index, StartPixelIndex, indicates the corresponding index to the list, RowIndexList. For example, the start x-coordinate for row index equal to one (1) is zero (0) and the start pixel index is five (5).

Then, processing proceeds to step 1630, where the difference between the ThreadIndex and the StartPixelIndex is determined as DeltaX, as follows:

DeltaX=ThreadIndex−RowInfo.StartPixelIndex

The difference between the ThreadIndex variable and the StartPixelIndex variable indicates the number of pixels between the current rendered pixel and the first pixel in the selected row.

Processing proceeds to a calculating step 1640, where the pixel position (x, y) is calculated under execution of the controller processors 170. The x-coordinate equals the value of the variable, DeltaX, plus the value of the variable, StartX, of the selected row while the y-coordinate is equal to the value of the variable, RowIndex, plus the value of the variable, StartY, of the region as follows:

x=DeltaX+RowInfo.StartX y=RowIndex+StartY

Upon completion of the step 1640, the method 1600 concludes.

There is no determination step or branch instruction involved in the method 1600. Therefore, it is more efficient to execute the method 1600 on the GPU 172 because of the branch divergence problem in the GPU execution model. On the GPU 172, since all threads in a warp (i.e., the smallest executable unit of parallelism on the GPU 172) execute one common instruction at a time, different branches of a conditional instruction are run one after another. Thus, serial execution of all branches slows down the execution time.

Figure 17:
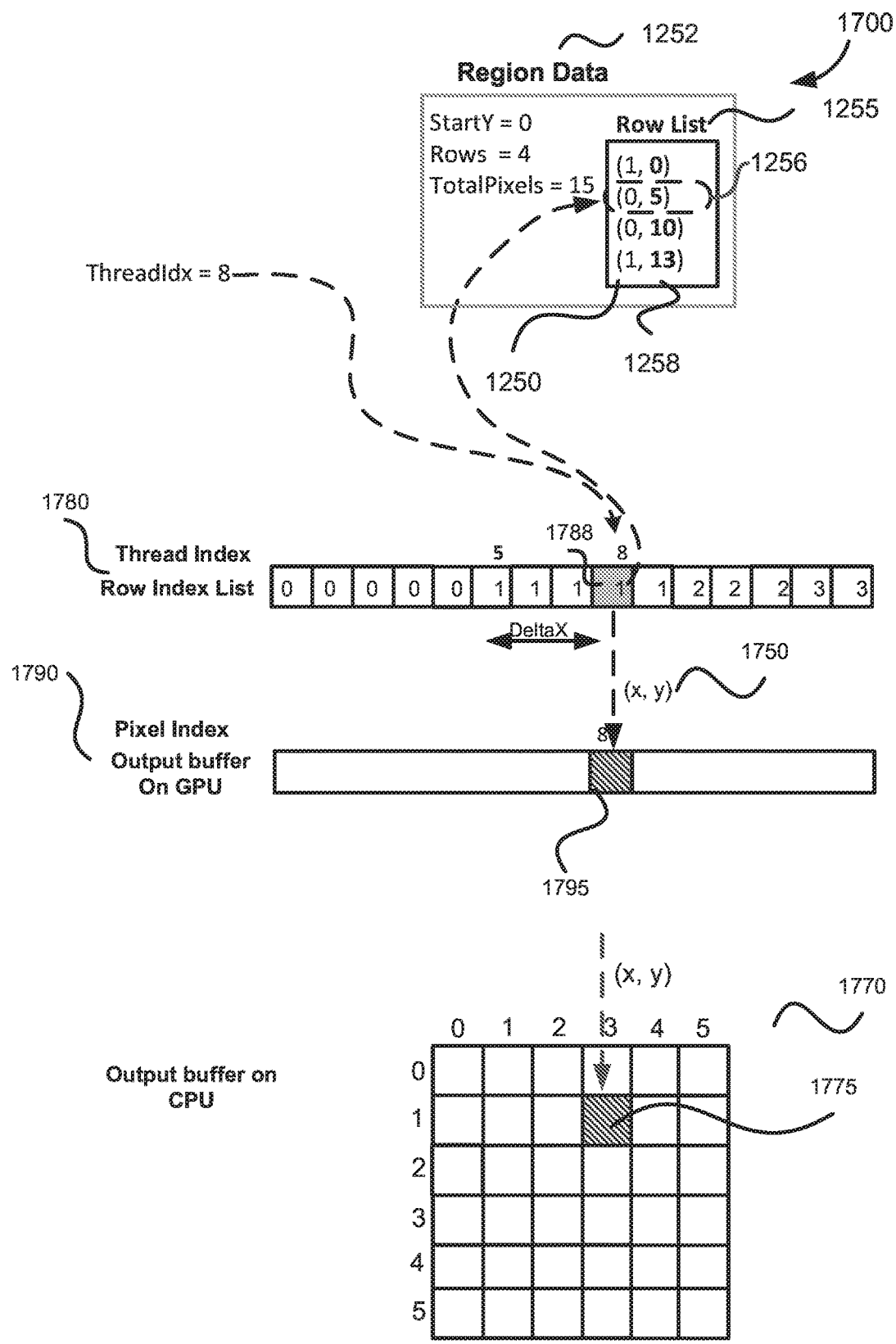
FIG. 17 shows an example of rendering a pixel in a non-rectangular region.

FIG. 17 shows an example of rendering a pixel in a non-rectangular region. In the example shown in FIG. 17, a thread with "ThreadIndex=8" is used to render pixel "8". Row index (RowIndex=1) is obtained from the list, RowIndexList, using the ThreadIndex 8 (RowIndexList[8]=1) 1788. Then the corresponding data 1256 in the Row List 1255 within the RegionData 1252 (i.e., RowInfo=(0, 5)) is fetched. The value of variable, StartX 1250, is zero (0) and the value of the index, StartPixelIndex 1258, equals five (5) in the row 1256. Then, the value of DeltaX is calculated by subtracting the value of the index, StartPixelIndex, from the index, ThreadIndex (i.e., 8−5=3). Finally, x is calculated as the sum of the value of DeltaX and the value of variable, StartX (i.e., 3+0=3), and y is equal to the value of the variable StartY plus the value of RowIndex (0+1=1). The pixel 1795 at PixelIndex 8 in the output buffer on the GPU 172 therefore corresponds to the pixel 1775 at position (x, y)=(3, 1) 1750 in the output buffer 1770 on the CPU 171.

In one arrangement, the determined non-rectangular region in step 620 is rendered by a plurality of threads of the multi-threaded rendering unit. As shown in FIG. 14B, each rendering thread is associated with a pixel on an identified scan line of the determined region, with a thread rendering the first pixel referenced by index data structure, StartPixelIndex 1258, on the scan line of the determined region. A thread rendering a pixel (e.g., the first pixel) on the identified scan line determines the pixel position (x, y) by obtaining row index data structure 1410 in the RowIndexList 1280 indexed by the thread index 1290, then fetches a RowInfo 1256 from the RowList 1255 indexed by the row index. The coordinates (x, y) of the rendered pixel is determined using at least a thread identified by the thread index 1290 and the scan line identified by the by the RowIndexList 1280. The thread then finally calculates the x-coordinate and y-coordinate.

A reference is created for at least one of the threads rendering the pixel in the output buffer 1230. The pixel in the output buffer 1230 is referenced by a reference in the form of index, PixelIndex. As the thread index is identical to the pixel index, the corresponding pixel's position (x, y) can be determined through the data, RegionData 1252, and the list, RowIndexList 1280, which establish an association between a thread and a pixel. The rendered pixels in the output buffer 1230 are copied into the CPU output buffer 1490 of the fillmap tile. The determined non-rectangular region is rendered by combining the rendered pixels in the output buffer 1230 with the output of rendering at least one other further region using the rendered pixels in the output buffer 1230 and corresponding threads of the multi-threaded system 100. The rendered pixels of the other further regions of the tile can be combined in the CPU output buffer 1490.

In another arrangement, if the computer system 100 has a shared memory model for the GPU 172 and the CPU 171, the rendered pixel 1775 is written to the output buffer 1770 directly using the determined (x, y) without the need of the output buffer 1790 on the GPU 172.

GPU Pixel-Parallel Rendering for a Rectangular Region

The rendering of the rectangular region as executed at step 980 will now be described. The rendering of the rectangular region at step 980 is similar to the rendering of a non-rectangular region at step 940. The only difference of rendering a rectangular region is how to determine a pixel position (x, y) at the step 1502. As the RegionData for a rectangular region has an origin at the top-left corner (OrigX, OrigY) and the dimension of the region (Width, Height), a thread can calculate the position of a corresponding pixel to be rendered in step 1502 by the following pseudocode:

x = ThreadIndex % Width + OrigX
y = ThreadIndex / Width + OrigY

Figure 15:
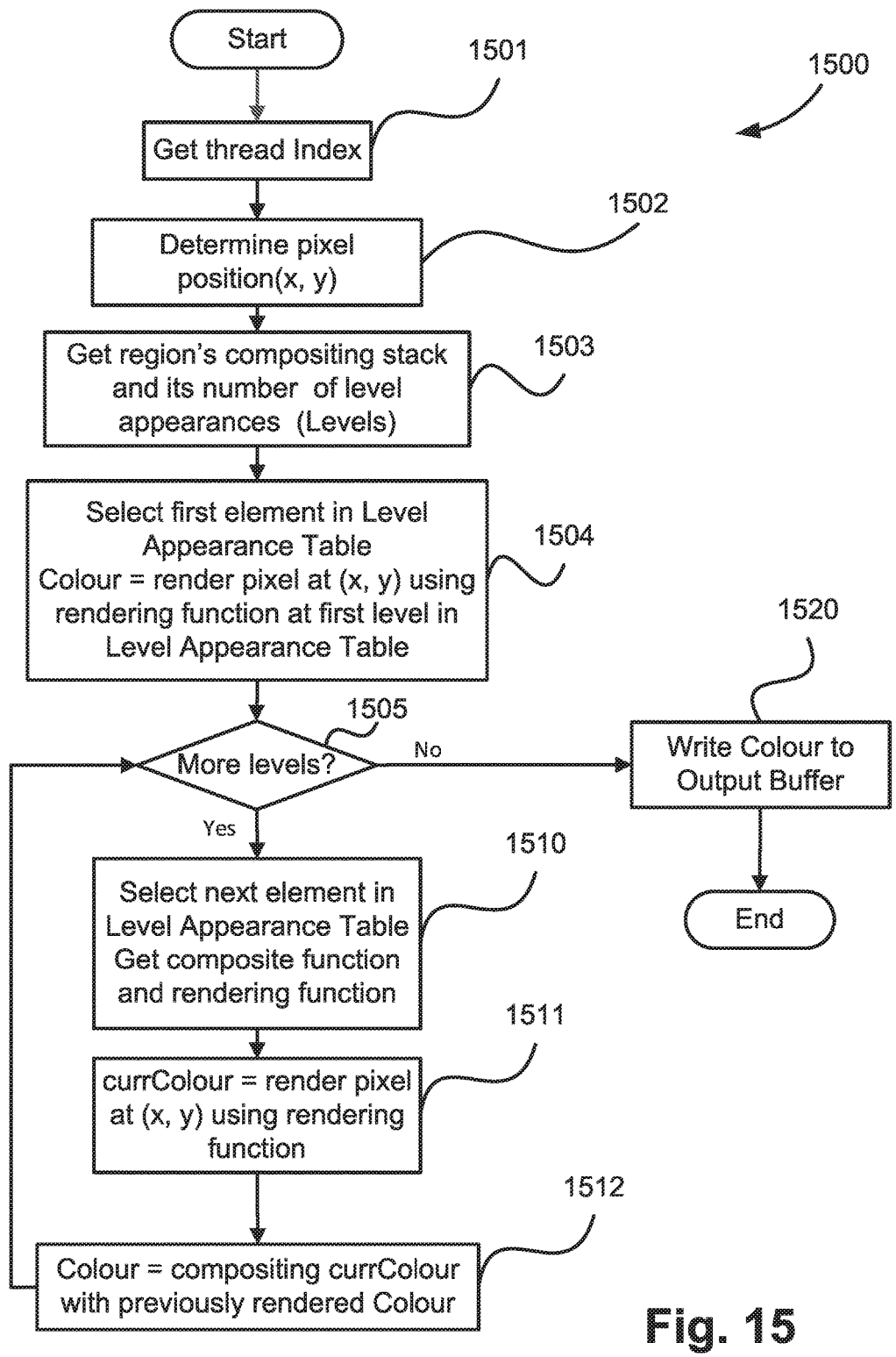
FIG. 15 is a schematic flow diagram showing a method of rendering a pixel by a thread.

The remaining steps of the method 1500 in FIG. 15 are the same as rendering a non-rectangular region. The "%" is a modulo operator while "/" is an integer division operator.

The output buffer on the GPU 172 is not required for rendering a rectangular region. Thus, step 930 is not required for rendering the rectangular region on the GPU 172.

Rendering a Parallelogram Region

In another arrangement, a region is non-rectangular with parallel left and right edges (i.e., not vertical edges) forming a parallelogram. The detection of a parallelogram region can be implemented using the method 700 described previously with reference to FIG. 7. For a parallelogram region, at the step 706, a variable DeltaX is initialised to the difference between the StartX on the first and the second rows. Then, for every processed row from the third row, the difference between the variable, StartX, of the current row and the variable, StartX, of the previous row is compared with the value of DeltaX. If the change of the variable, StartX, for every two successive rows is substantially the same, and the width of every row is the same, the region is considered as a parallelogram region. By substantially same for changes in DeltaXs between successive rows, it means that the changes might not be exactly the same or constant. For example, first DeltaX is two (2) pixels, second DeltaX is one (1) pixel, third is two (2) and fourth is one (1) again, and so on. The variable, StartX, of a row and x-coordinate of a pixel can be determined using an expression and extra parameters to capture the DeltaX changes.

Figure 19:
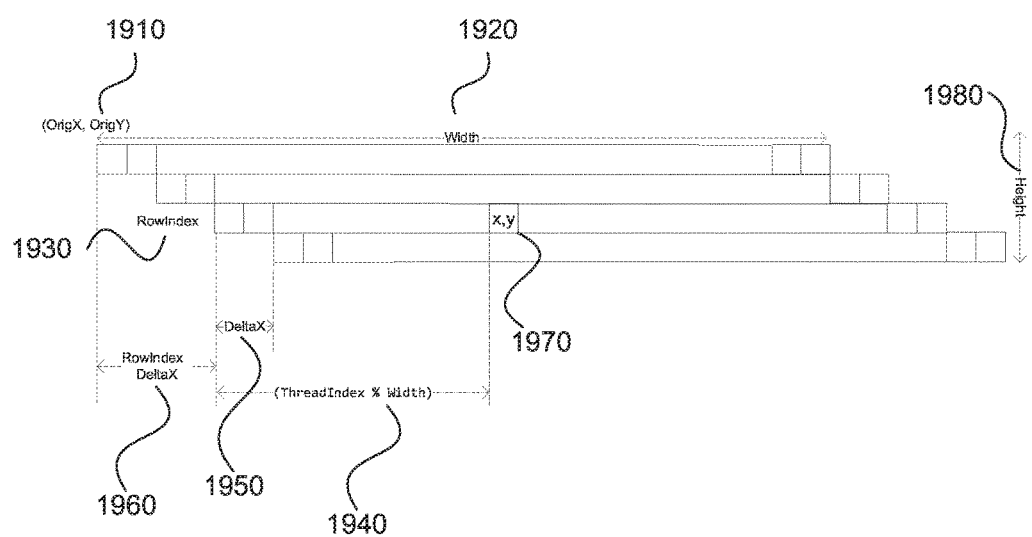
FIG. 19 shows a parallelogram region and parameters required for parallel rendering.

FIG. 19 shows an example of a parallelogram region with an origin at the top left corner, (OrigX, OrigY) 1910 and a dimension (Width 1920, Height 1980). DeltaX 1950 specifies the constant change of x-value in every two successive rows. The DeltaX data could be passed to the GPU kernel at launching time. As the list, RowIndexList, is not required in the regular shaped parallelogram region of FIG. 19, the preparation of the RowIndexList at step 930 is ignored.

Similar to the rendering step 980, the parallelogram region rendering kernel is launched with a number of pixels equal to the Width 1920 multiplied by the Height 1980.

When rendering a parallelogram region, at the step 1502, the determination of a pixel position (x, y) 1970 rendered by a thread (ThreadIndex) can be described in the following pseudocode:

```
RowIndex = ThreadIndex / Width
x = OrigX + (ThreadIndex % Width) + RowIndex * DeltaX
y = OrigY + RowIndex
```

The RowIndex 1930 is calculated by the thread index, ThreadIndex, divided by the width, Width, of the parallelogram region.

The x-coordinate of the pixel to be rendered 1970 is computed using the following three terms:
1) OrigX specifies the x-coordinate of the first pixel in the first row of the region;
2) (ThreadIndex % Width) 1940 is the offset (number of pixels) from the pixel being rendered to the first pixel in the current row; and
3) (RowIndex*DeltaX) 1960 is the number of pixels between the first pixel of the current row and the first pixel of the first row. This is the total offset from the first pixel of the current row to the first pixel of the first row in horizontal direction.

The y-coordinate is the RowIndex plus the OrigY.

Once the pixel position (x, y) is determined, the rendering process 1304 proceeds to step 1503.

The described methods can be generalised for any region that has a regular shape (e.g., rectangle or parallelogram) where the x-coordinate and y-coordinate can be calculated with functions of the indices RowIndex and ThreadIndex as described below:

$x$=Func1(RowIndex,ThreadIndex)

$y$=Func2(RowIndex,ThreadIndex)

Functions Func1 and Func2 should not have many branch instructions so that the GPU execution of the functions can be efficient. The determination step 1502 will not need the RowIndexList 1780 and the preparation step before the rendering 930 is ignored. Therefore, the described rendering methods can be simplified for rectangle or parallelogram shaped regions.

Rendering Multiple Pixels Per Thread

In another arrangement, one thread renders multiple pixels. All pixels in the region are divided into equal sized groups, except the last group might have fewer numbers of pixels than remaining groups. Each thread renders a group of pixels. The thread group size (number of pixels per group) is predetermined according to the capabilities and features of the GPU hardware or through experimentations. The number of threads is then calculated by the following pseudocode:

```
NumOfThreads = TotalPixels / ThreadGroupSize
Residue = TotalPixels % ThreadGroupSize
IF Residue > 0 THEN NumOfThreads = NumOfThreads + 1
```

Figure 18:
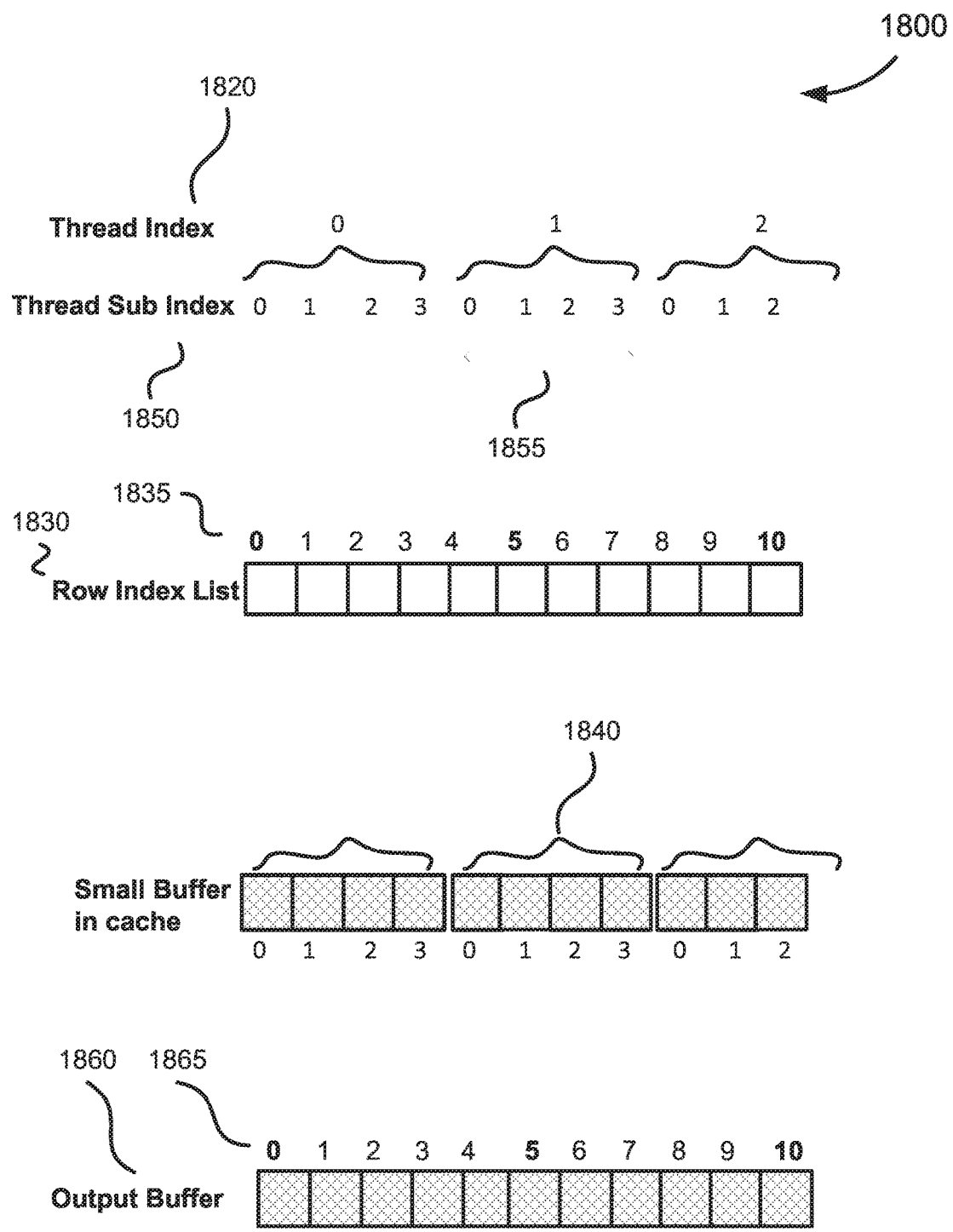
FIG. 18 shows an example of using one thread to render multiple pixels.

FIG. 18 shows an example where eleven (11) pixels in a region are rendered and a thread group size is set to four (4). Using the pseudocode immediately above for determining the number of threads, the number of threads is calculated as 11/4+1=3, i.e., there are three (3) parallel threads.

Alternatively, if the number of threads is predetermined, the thread group size can be calculated using the following pseudocode:

```
ThreadGroupSize = TotalPixels / NumOfThreads
Residue = TotalPixels % NumOfThreads
IF Residue > 0 THEN ThreadGroupSize = ThreadGroupSize + 1
```

When rendering in parallel, each thread iterates the index, ThreadSubIndex 1850, from zero (0) to ThreadGroupSize 1844 minus one (1) or the maximum number allowed in the last thread group. For example, the first two threads will render four (4) pixels, each of which is indexed by a ThreadSubIndex 1850 (from 0 to 3). The last thread only iterates the ThreadSubIndex from zero (0) to the residue of the modular division previously described. In the example of FIG. 18, the last ThreadSubIndex in the last thread is two (2).

Each ThreadSubIndex in a thread corresponds to a pixel index 1835 which is calculated by multiplying ThreadIndex 1820 with the thread group size ThreadGroupSize 1840 and then adding the thread sub index, ThreadSubIndex, as follows:

PixelIndex=ThreadIndex*ThreadGroupSize+ThreadSubIndex

The pixel index, PixelIndex, is used for indexing the RowIndexList 1280 to get a RowIndex 1410, then the pixel position is determined as described in relation to step 1502.

Each rendered pixel colour is written to a small buffer 1840 defined in the cache 335 on the GPU memory which has a faster memory access time than to a main memory on the GPU. When all pixels assigned to a thread are rendered into the small buffer 1840, the pixels can be copied to the output buffer 1860 in the main memory on the GPU, which is more efficient than using one thread for rendering one pixel.

The size of the small buffer 1840 depends on the cache size 335 of the GPU 172. The size of the small buffer 1840 will affect the determination of the ThreadGroupSize.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive. Accordingly, although the description is directed primarily to region-based intermediate representations of images in the form of fillmaps having edges and fills, other region-based intermediate representations can also be processed using the disclosed PPRR arrangements.

The invention claimed is:

1. A method of rendering an image, the method comprising:
assigning a multi-threaded rendering unit to render a region of the image using a plurality of threads, the plurality of threads comprising at least a first thread and a second thread;
for a first thread rendering a pixel on a scan line of the region, determining using an identifier of the first thread, an index of a start pixel on said scan line rendered by the second thread;
rendering the pixel by the first thread using a position of the pixel determined based on the index of the start pixel and the identifier of the first thread; and
rendering the image by combining rendered pixels of the region based on positions of the rendered pixels.

2. The method according to claim 1, further comprising identifying a plurality of pixel run lengths for all scan lines of the region.

3. The method according to claim 2, further comprising, for each scan line, determining an index of the start pixel on said scan line based on the identified plurality of pixel run lengths.

4. The method according to claim 1, further comprising associating each thread with an identifier of a scan line on which said thread renders a pixel.

5. The method according to claim 1, further comprising, for each pixel in the region, determining coordinates for placing the pixel in the rendered image.

6. The method according to claim 1, further comprising, for a thread rendering a pixel, determining a corresponding scan line to place the rendered pixel in, the corresponding scan line is determined using a data structure indexed by a thread identifier, the data structure being derived from a run-based representation of the region.

7. The method according to claim 1, further comprising determining an index of the start pixel using a data structure indexed by a scan line.

8. The method according to claim 1, further comprising determining an index of the pixel rendered by the first thread; and
determining a position of the pixel rendered by the first thread using the index of the start pixel and the index of the pixel rendered by the first thread.

9. The method according to claim 1, further comprising determining a region suitable for rendering by the plurality of threads by detecting a region having complexity above a predetermined threshold and being significantly different from compositing complexity of other regions within the same tile.

10. The method according to claim 1, wherein if the image is uniformly complex, and the complexity is below a predetermined threshold, a processing mode is determined for the whole image.

11. The method according to claim 1, further comprising, if the image is non-uniformly complex, determining at least two processing modes for the image, one for at least one region with different complexity.

12. The method according to claim 1, wherein each pixel is rendered by a thread having a thread index referring to a scan line where the pixel appears, the thread index being stored in a list of indices to the scan lines, the list of indices indicating the total number of pixels in the region, the number of pixels corresponding to the number of threads executing concurrently.

13. The method according to claim 1, wherein each entry in a list of indices to scan lines refers to a coordinate of a start pixel of the region on a scan line and to an index of the start pixel.

14. The method according to claim 1, further comprising:
storing the rendered pixels of the region in an intermediate buffer in a compact format on a graphics processing unit (GPU); and
distributing the rendered pixels to corresponding locations in an output buffer on a central processing unit (CPU).

15. The method according to claim 1, further comprising identifying a plurality of pixels to be rendered using a single set of rendering instructions.

16. The method according to claim 1, further comprising
a) creating an output buffer for the pixels in the region; and
b) establishing a correspondence between the pixels in the output buffer and parallel threads using thread indices and identified pixel run lengths.

17. The method according to claim 1, further comprising creating a row index list that contains row indices referring to the scan lines in the region, the row index list referring to indices of start pixels for each of the scan lines in the region.

18. The method according to claim 1, wherein the image is rendered using a number of parallel threads, the number of threads being equal to the total number of pixels in the region, each thread executing a rendering function provided in the associated compositing stack for a corresponding pixel.

19. A system for rendering an image, the system comprising:
a memory for storing data and a computer program;
a processor coupled to the memory for executing the computer program, the computer program comprising instructions for:
assigning a multi-threaded rendering unit to render a region of the image using a plurality of threads, the plurality of threads comprising at least a first thread and a second thread;
for a first thread rendering a pixel on a scan line of the region, determining, using an identifier of the first thread, an index of a start pixel on said scan line rendered by the second thread;
rendering the pixel by the first thread using a position of the pixel determined based on the index of the start pixel and the identifier of the first thread; and
rendering the image by combining rendered pixels of the region based on positions of the rendered pixels.

20. An apparatus for rendering an image, the apparatus comprising:
means for assigning a multi-threaded rendering unit to render a region of the image using a plurality of threads, the plurality of threads comprising at least a first thread and a second thread;
means for, for a first thread rendering a pixel on a scan line of the region, determining, using an identifier of the first thread an index of a start pixel on said scan line rendered by the second thread;
means for rendering the pixel by the first thread using a position of the pixel determined based on the index of the start pixel and the identifier of the first thread; and
means for rendering the image by combining rendered pixels of the region, based on positions of the rendered pixels.

21. A non-transitory computer readable medium having a computer program stored thereon for rendering an image, the program comprising:
- code for assigning a multi-threaded rendering unit to render a region of the image using a plurality of threads, the plurality of threads comprising at least a first thread and a second thread;
- code for, for a first thread rendering a pixel on a scan line of the region, determining, using an identifier of the first thread an index of a start pixel on said scan line rendered by the second thread;
- code for rendering the pixel by the first thread using a position of the pixel determined based on the index of the start pixel and the identifier of the first thread; and
- code for rendering the image by combining rendered pixels of the region based on positions of the rendered pixels.

* * * * *